US012324473B2

(12) United States Patent
Tutunaru

(10) Patent No.: US 12,324,473 B2
(45) Date of Patent: Jun. 10, 2025

(54) PROTECTIVE HEADGEAR AND METHODS FOR MAKING SAME

(71) Applicant: IMPACT SOLUTION LLC, Los Angeles, CA (US)

(72) Inventor: Catalin Tutunaru, Cape Elizabeth, ME (US)

(73) Assignee: Impact Solutions, Hermosa Beach, CA (US)

( * ) Notice: Subject to any disclaimer, the term of this patent is extended or adjusted under 35 U.S.C. 154(b) by 0 days.

(21) Appl. No.: 16/131,050

(22) Filed: Sep. 14, 2018

(65) Prior Publication Data

US 2019/0014848 A1 Jan. 17, 2019

Related U.S. Application Data

(63) Continuation-in-part of application No. 15/883,315, filed on Jan. 30, 2018, now Pat. No. 11,039,653, and
(Continued)

(51) Int. Cl.
A42B 3/06 (2006.01)
A42B 3/04 (2006.01)
(Continued)

(52) U.S. Cl.
CPC .......... *A42B 3/063* (2013.01); *A42B 3/0406* (2013.01); *A42B 3/046* (2013.01); *A42B 3/069* (2013.01);
(Continued)

(58) Field of Classification Search
CPC ....... A42B 3/063; A42B 3/0406; A42B 3/046; A42B 3/121; A42B 3/124; A42B 3/125;
(Continued)

(56) References Cited

U.S. PATENT DOCUMENTS 2,296,335 A 9/1942 Brady
3,113,318 A 12/1963 Marietta
(Continued)

FOREIGN PATENT DOCUMENTS

EP 0790787 B1 9/2000
WO 0035307 A1 6/2000
(Continued)

OTHER PUBLICATIONS

Sprenger, Stephan et al., Carbon fiber-reinforced composites using an epoxy resin matrix modified with reactive liquid rubber and silica nanoparticles, Dec. 10, 2014, ScienceDirect, vol. 105, pp. 86-95 (Year: 2014) (Year: 2014).*
(Continued)

*Primary Examiner* — F Griffin Hall
(74) *Attorney, Agent, or Firm* — Potomac Law Group, PLLC; Reza Mollaaghababa; Brian Hairston

(57) ABSTRACT

A protective headgear can include a core and two or more impact absorbing layers coupled to the core. At least one impact absorbing layer can include a number of impact absorbing components that are configured to absorb and reduce the force of impact incident on the protective headgear. The impact absorbing materials can employ cylindrical segments of viscoelastic foam with a sealed central void to absorb high energy impacts. The protective helmet can reduce the occurrence of concussions and subconcussive impacts to the brain.

16 Claims, 29 Drawing Sheets

Related U.S. Application Data a continuation-in-part of application No. PCT/US2016/024395, filed on Mar. 27, 2016.

(60) Provisional application No. 62/452,577, filed on Jan. 31, 2017.

(51) Int. Cl.
| | | |
|---|---|---|
| *A42B 3/12* | (2006.01) | |
| *A42B 3/20* | (2006.01) | |
| *A42B 3/32* | (2006.01) | |
| *B32B 3/18* | (2006.01) | |
| *B32B 5/02* | (2006.01) | |
| *B32B 5/12* | (2006.01) | |
| *B32B 5/24* | (2006.01) | |
| *F16F 3/087* | (2006.01) | |
| *F16F 13/06* | (2006.01) | |

(52) U.S. Cl.
CPC .............. *A42B 3/121* (2013.01); *A42B 3/124* (2013.01); *A42B 3/125* (2013.01); *A42B 3/32* (2013.01); *B32B 3/18* (2013.01); *F16F 3/0873* (2013.01); *F16F 13/06* (2013.01); *A42B 3/0433* (2013.01); *A42B 3/20* (2013.01); *B32B 5/02* (2013.01); *B32B 5/12* (2013.01); *B32B 5/245* (2013.01); *B32B 2262/106* (2013.01); *B32B 2307/56* (2013.01); *B32B 2437/04* (2013.01); *B32B 2571/02* (2013.01); *F16F 2224/0225* (2013.01); *F16F 2234/02* (2013.01); *F16F 2234/04* (2013.01)

(58) Field of Classification Search
CPC .... A42B 3/32; A42B 3/00; A42B 3/04; A42B 3/06; A42B 3/062; A42B 3/069; A42B 3/10; A42B 3/12; A42B 3/127; A42B 3/128; A42B 3/166; A42B 3/205; A42B 3/122; A42B 3/20; B32B 3/18; F16F 3/0873; F16F 13/06
USPC ................. 2/410, 411, 412, 414, 424, 425
See application file for complete search history.

(56) References Cited

U.S. PATENT DOCUMENTS

| | | | |
|---|---|---|---|
| 3,117,679 A | 1/1964 | Miers | |
| 3,174,155 A | 3/1965 | Pitman | |
| 3,186,004 A | 6/1965 | Carlini | |
| 3,242,500 A | 3/1966 | Derr | |
| 3,720,955 A | 3/1973 | Rawlings | |
| 3,992,721 A | 11/1976 | Morton | |
| 4,075,717 A | 2/1978 | Lemelson | |
| 4,124,904 A | 11/1978 | Matthes | |
| 4,223,409 A | 9/1980 | Lee | |
| 4,558,470 A * | 12/1985 | Mitchell | A42B 3/124 2/908 |
| 4,627,114 A | 12/1986 | Mitchell | |
| 4,903,346 A | 2/1990 | Reddemann et al. | |
| 4,937,888 A | 7/1990 | Straus | |
| 5,073,271 A | 12/1991 | Sander et al. | |
| 5,117,679 A | 6/1992 | Lewtas et al. | |
| 5,204,998 A * | 4/1993 | Liu | A42B 3/124 2/425 |
| 5,477,563 A | 12/1995 | Gentes et al. | |
| 6,073,271 A | 6/2000 | Alexander et al. | |
| 6,314,586 B1 | 11/2001 | Duguid | |
| 6,421,840 B1 | 7/2002 | Chen et al. | |
| 6,446,270 B1 | 9/2002 | Durr | |
| 6,468,644 B1 | 10/2002 | Hong et al. | |
| 6,854,133 B2 | 2/2005 | Lee et al. | |
| 7,328,462 B1 | 2/2008 | Straus | |
| 8,117,679 B2 | 2/2012 | Pierce | |
| 8,615,817 B2 * | 12/2013 | Phillips | A42B 3/064 2/2.5 |
| 8,640,267 B1 | 2/2014 | Cohen | |
| 8,739,317 B2 | 6/2014 | Abernethy | |
| 8,938,817 B1 | 1/2015 | Baldi | |
| 9,572,390 B1 | 2/2017 | Simpson | |
| 9,683,622 B2 | 6/2017 | Ferrara | |
| 9,737,106 B1 | 8/2017 | Cannon, Jr. | |
| 9,795,180 B2 * | 10/2017 | Lowe | A42B 3/125 |
| 9,861,153 B2 | 1/2018 | Finisdore | |
| 9,943,129 B2 | 4/2018 | Newman et al. | |
| 10,010,127 B1 | 7/2018 | Shaffer et al. | |
| 10,362,829 B2 | 7/2019 | Lowe | |
| 10,463,099 B2 | 11/2019 | Allen et al. | |
| 10,561,189 B2 | 2/2020 | Lee | |
| 2003/0200597 A1 | 10/2003 | Dennis et al. | |
| 2004/0168246 A1 | 9/2004 | Phillips | |
| 2005/0168246 A1 | 8/2005 | Sharma et al. | |
| 2005/0273911 A1 | 12/2005 | Skiba et al. | |
| 2006/0059605 A1 | 3/2006 | Ferrara | |
| 2006/0059606 A1 | 3/2006 | Ferrara | |
| 2008/0155735 A1 * | 7/2008 | Ferrara | A01N 25/34 2/412 |
| 2009/0044316 A1 * | 2/2009 | Udelhofen | A63B 71/10 2/9 |
| 2009/0260133 A1 | 10/2009 | Del Rosario | |
| 2010/0088807 A1 | 4/2010 | Jeong et al. | |
| 2012/0017358 A1 | 1/2012 | Princip et al. | |
| 2012/0177869 A1 * | 7/2012 | Micarelli | B32B 5/12 428/105 |
| 2013/0133128 A1 * | 5/2013 | Hein | A42B 3/16 181/175 |
| 2013/0174329 A1 | 7/2013 | Hanson et al. | |
| 2013/0254978 A1 | 10/2013 | Mcinnis et al. | |
| 2013/0340147 A1 | 12/2013 | Giles | |
| 2014/0259316 A1 | 9/2014 | Katz | |
| 2014/0373257 A1 * | 12/2014 | Turner | A42B 1/0183 2/414 |
| 2015/0000011 A1 | 1/2015 | Redpath et al. | |
| 2015/0089721 A1 * | 4/2015 | Hanna | A42B 3/069 2/412 |
| 2015/0101899 A1 | 4/2015 | Russo et al. | |
| 2015/0113718 A1 * | 4/2015 | Bayer | A41D 13/0512 2/461 |
| 2015/0223546 A1 * | 8/2015 | Cohen | A42B 3/127 2/412 |
| 2015/0305430 A1 * | 10/2015 | Rush | A42B 3/125 2/412 |
| 2015/0359288 A1 | 12/2015 | Woxing et al. | |
| 2016/0029731 A1 * | 2/2016 | Magee | A42B 3/003 2/412 |
| 2016/0113348 A1 | 4/2016 | Twardowski, Jr. et al. | |
| 2016/0120238 A1 * | 5/2016 | Duncan | A63B 71/1291 2/462 |
| 2016/0242487 A1 * | 8/2016 | LaRocque | A42B 3/069 |
| 2016/0270471 A1 * | 9/2016 | Merrell | A42B 3/121 |
| 2016/0324247 A1 * | 11/2016 | Warmouth | A42B 3/283 |
| 2017/0065018 A1 * | 3/2017 | Lindsay | A42B 3/067 |
| 2017/0127748 A1 | 5/2017 | Sethumadhavan et al. | |
| 2017/0232327 A1 | 8/2017 | Kuntz et al. | |
| 2017/0265557 A1 | 9/2017 | Mercado, Jr. et al. | |
| 2017/0303612 A1 * | 10/2017 | Morgan | A42B 3/128 |
| 2017/0303622 A1 | 10/2017 | Stone et al. | |
| 2018/0132557 A1 | 5/2018 | Torres et al. | |
| 2018/0213875 A1 | 8/2018 | Tutunaru | |
| 2018/0326288 A1 | 11/2018 | Simpson et al. | |
| 2019/0001650 A1 | 1/2019 | Sohn et al. | |
| 2019/0014848 A1 | 1/2019 | Tutunaru | |
| 2019/0029353 A1 | 1/2019 | Ogata | |
| 2020/0163399 A1 | 5/2020 | Tutunaru et al. | |

FOREIGN PATENT DOCUMENTS

| | | |
|---|---|---|
| WO | 2000035307 A1 | 6/2000 |
| WO | 2017001619 A1 | 1/2017 |
| WO | 2017171694 A1 | 10/2017 |
| WO | 2018144420 A1 | 8/2018 |

(56) References Cited

FOREIGN PATENT DOCUMENTS

OTHER PUBLICATIONS

Sprenger, Stephan et al., Carbon fiber-reinforced composites using an epoxy resin matrix modified with reactive liquid rubber and silica nanoparticles, Dec. 10, 2014, ScienceDirect, vol. 105, pp. 86-95 (Year: 2014).*
Sprenger, Stephan et al., Carbon fiber-reinforced composites using epoxy resin matrix modified with reactive liquid rubber and silica nanoparticles, Dec. 10, 2014, ScienceDirect, vol. 105, pp. 86-95 (Year: 2014).*
U.S. Appl. No. 15/883,315, filed Jan. 30, 2018, Catalin Tutunaru.
U.S. Appl. No. 16/088,744, filed Sep. 26, 2018, Catalin Tutunaru.
International Preliminary Peport on Patentability, PCT/US2016/024395, dated Jun. 13, 2017, 7 pages.
International Search Report and Written Opinion, PCT/US2016/024395, dated Jun. 16, 2016, 7 pages.
International Search Report and Written Opinion, PCT/US2018/015852, dated May 23, 2018, 12 pages.
Some foreign references and the NPLs are not submitted herewith as they can be retrieved in the U.S. Appl. No. 15/883,315, filed Jan. 30, 2018.
International Preliminary Report on Patentability, PCT/US2016/024395, dated Jun. 13, 2017.
International Search Report and Written Opinion, PCT/US2016/024395, dated Jun. 16, 2016.
International Search Report dated May 23, 2018 from corresponding PCT/US18/15852.
International Written Opinion dated May 23, 2018 from corresponding PCT/US18/15852.
Canadian Office Action for Canadian Application No. 3,052,260 dated Jun. 6, 2024.

\* cited by examiner

PROTECTIVE HEADGEAR AND METHODS FOR MAKING SAME

CROSS REFERENCE TO RELATED APPLICATIONS

This application claims priority to and is a continuation-in-part application of U.S. application Ser. No. 15/883,315, filed on Jan. 30, 2018, which claims priority to and the benefit of U.S. Provisional Application No. 62/452,577, filed Jan. 31, 2017. This Application also claims priority to and the benefit of Patent Cooperation Treaty Application No. PCT/US16/24395, filed on Mar. 27, 2016. The entire teachings of these earlier applications are incorporated by reference herein.

FIELD

The present disclosure generally relates to protective headgears, and more particularly to helmets such as football helmets.

BACKGROUND

In recent years, there has been a significant amount of research into the health risks associated with repetitive head trauma. In the game of American football, players are often subjected to player-to-player contact, and it is not uncommon for a player's head to strike the ground or another player. To prevent injuries to the head and face, football players often wear a helmet with a hard shell, internal padding, and a wire face guard. Such existing helmets can generally protect players from broken bones and abrasions in their head and face but are often inadequate at protecting players from internal injuries, specifically injuries to the brain.

For example, studies have indicated that football players can be susceptible to developing chronic traumatic encephalopathy ("CTE"), which is a degenerative disease that has been attributed to repetitive concussions or subconcussive impacts to the brain. However, instead of preventing the concussions and subconcussive impacts that are theorized to cause CTE, existing football helmets can potentially exacerbate trauma to the brain in certain impacts. For instance, when football players have head-to-head contact, the hard shell of existing football helmets can create a nearly elastic collision, where the kinetic energy of the two helmets before the collision is nearly equal to their kinetic energy after the collision. This effect can be similar to a first moving pool ball hitting a second stationary pool ball. After the impact, the first ball can become stationary and the second ball can begin to move at approximately the same rate as the first ball originally was moving. When football players experience such head-to-head contact, the force of the impact is not always absorbed by existing helmets, but rather, like a pool ball, the force can be conserved and exerted on one or more player's head.

Further, by not absorbing the energy of impacts, but instead conserving the energy, existing football helmets do not always adequately protect the brain from concussions and subconcussive impacts. The nearly elastic collisions that are often characteristic of the existing football helmets can also amplify the magnitude of force exerted on the neck and brain stem of players, potentially causing neck injuries or other brain injuries that are not yet known.

BRIEF SUMMARY

The present disclosure relates to protective headgears, such as football helmets, which can protect the brain from receiving concussions and reduce the magnitude of subconcussive impacts, while providing more effective contact with a wearer's head. Protective headgears according to embodiment disclosed herein are configured to prevent the brain from receiving concussions and subconcussive impacts and reduce the prevalence of gaps between a wearer's head and the internal padding of the helmet.

In one aspect, a protective headgear is described. The protective headgear can comprise a core and a plurality of impact absorbing layers disposed on the core and configured to absorb impact incident on the protective headgear. The impact absorbing layers can be configured such that at least one impact absorbing layer comprises a plurality of impact absorbing components.

In other examples, any of the aspects above, or any system, method, apparatus described herein can include one or more of the following features.

The core can comprise a rigid material. Additionally or alternatively, the core can comprise two or more layers of materials. For example, the core can comprise at least one of a layer of carbon fiber, a layer of carbon fiber reinforced polymer, and a layer of Kevlar® reinforced polymer. The layer of carbon fiber reinforced polymer can comprise a plurality of carbon filaments combined with a resin and a rubberizing compound. Additionally or alternatively, the core can comprise a rubberizing compound configured to increase the flexibility of the core to the impact. Further, at least one layer of the core can be configured to be thicker than at least one other layer of the core by at least two orders of magnitude.

The plurality of impact absorbing layers can comprise an outer layer configured to contact a head of a wearer of the protective headgear. The outer layer can be configured to conform to the head of the wearer and reduce any gaps between the outer layer and the head of the wearer. Additionally or alternatively, the plurality of impact absorbing layers can comprise at least one of a rigid layer and a non-rigid layer. For example, the non-rigid layer can comprise a viscoelastic material. By way of example, the viscoelastic material can comprise a viscoelastic polyurethane foam, a low-resilience polyurethane foam, and a memory foam. Further, the non-rigid layer can be configured to provide at least one of cushioning head of a wearer of the protective headgear against the impact, absorption of the impact, and regulation of temperature of the head of the wearer.

The plurality of impact absorbing layers can further comprise at least one barrier layer configured to reduce flow of environmental elements on the protective headgear. The barrier layer can be configured to be at least one of air permeable, partially-permeable, and semi-permeable.

Additionally or alternatively, the plurality of impact absorbing layers can comprise a liner removably and replaceably coupled to an interior of the protective headgear. The liner can comprise at least one of a material providing a wicking effect, a material providing an anti-bacterial effect, a material providing an anti-microbial effect, and a material configured to function as a moisture barrier. In some embodiments, the liner comprises at least one of polyester, spandex, and cotton.

Further, the plurality of impact absorbing elements can comprise a non-rigid material. The plurality of impact absorbing elements can comprise at least one of fluid-filled bladders, gas-filled bladders, liquid-filled bladders, semi-fluid-filled bladders, semisolid bladders, vinyl encased impact absorbing members, and mechanical shock absorbing components.

Additionally or alternatively, the plurality of impact absorbing elements comprise can one or more layers of foam. The one or more layers of foam can comprise an open cell structure foam. Additionally or alternatively, the one or more layers of foam can comprises at least one of a viscoelastic foam, a hard firmness foam, a medium firmness foam, a soft firmness foam, a soft to medium lightweight viscoelastic layer of foam, a gel like foam, a viscoelastic foam, and a soft dough-like consistency foam. The plurality of impact absorbing elements can comprise at least one of one or more cylindrical-shaped impact absorbing components, one or more modified cylindrical-shaped impact absorbing components, one or more conical-shaped impact absorbing components, and one or more generally conical-shaped impact absorbing components. In some embodiments, at least one of the plurality of impact absorbing elements can comprise at least one hole. The at least one hole can comprise at least one of a cylindrical hole, a cylindrical hole oriented along a longitudinal axis of an impact absorbing element, an axial hole, a through hole, a countersunk hole, and a hole positioned centrally within an impact absorbing element.

In some embodiments, the at least one impact absorbing layer can comprise at least one of one or more conical-shaped impact absorbing components and one or more generally conical-shaped impact absorbing components in one or more areas of the protective headgear corresponding to portions of a head of a wearer of protective headgear that are expected to be exposed to increased levels of impact. Further, at least one conical-shaped impact absorbing component or at least one generally conical-shaped impact absorbing component can comprise a first end coupled to the core and a second end disposed on an opposite side of the first end. Additionally or alternatively, at least two of the plurality of impact absorbing elements can be disposed adjacent to and in contact with one another. Further, the plurality of impact absorbing elements can be configured to be at least one of air permeable, partially-permeable, and semi-permeable.

Further, the protective headgear can comprise at least one of: a forehead pad configured to be disposed at a portion of the protective headgear where a forehead of a wearer of the protective headgear is expected to abut the protective headgear, one or more elongate strips configured to be disposed at a portion of the protective headgear where a side of the wearer's head is expected to abut the protective headgear, and one or more ear strips configured to be disposed at a portion of the protective headgear where an ear of the wearer is expected to abut the protective headgear. The at least one of the forehead pad, the one or more elongate strips, and the one or more ear strips can comprise at least one impact absorbing component. Further, the one or more ear strips can be configured to protect at least one of an area surrounding the ear of the wearer, an area above the ear of the wearer, and an area below the ear of the wearer. Additionally or alternatively, the one or more elongate strips can be configured to form a circumferential band about a base of the protective headgear.

The protective headgear can further comprise at least one external water-resistant layer that is configured to provide a waterproofing effect to the core and the plurality of impact absorbing layers. The at least one water-resistant layer can comprise at least one of a waterproof coating, a rubberized coating, a room temperature vulcanization silicone, and a flexible polyurethane adhesive.

The protective headgear can also comprise at least one abrasion resistance layer. The at least one abrasion resistance layer can comprise a flexible abrasion resistant material, a fiber reinforced cloth, one or more layers of an ethylene-vinyl acetate-based material.

The protective headgear can also comprise an acoustic element configured to reduce one or more predetermined sound frequencies. The acoustic element can comprises an acoustic foam. Additionally or alternatively, the protective headgear can also comprise one or more audio components (e.g., a speaker) disposed in one or more areas on an inside portion of the protective headgear where an ear of a wearer of the protective headgear is expected to abut. Additional audio components (e.g., speakers) can be coupled to the protective headgear such that the one or more audio components are disposed near an area where a mouth of a wearer of the protective headgear is expected to be positioned.

Further, the protective headgear can comprise one or more sensors coupled to at least one area on the protective headgear. For example, at least one sensor can be coupled to the core and/or to at least one of the plurality of impact absorbing layers. The one or more sensors can be configured to collect information regarding forces incident on the protective headgear. For example, the one or more sensors can be configured to collect information regarding forces experienced by a wearer of the protective headgear. In some embodiments, the one or more sensors can be configured to collect information regarding at least one of temperature and humidity level inside the protective headgear. Further, the one or more sensors can be configured to detect existence of a gap between an innermost layer of the protective headgear and a wearer's head. The information collected by the sensors can be transmitted by the sensors to a remote processor.

The protective headgear can also comprise a face mask. The face mask can comprise a plurality of elongate bars. Further, the face mask can be removably coupled to the protective headgear. For example, the face mask can be coupled to the protective headgear using one or more fasteners. Further, the face mask can be configured to break away from the protective headgear in response to a predetermined amount of force incident on the protective headgear. In some embodiments, the face mask can comprise a fiber reinforced carbon polymer. The fiber reinforced carbon polymer can comprise a rubberizing compound.

Other aspects and advantages of the invention can become apparent from the following drawings and description, all of which illustrate the various aspects of the invention, by way of example only.

BRIEF DESCRIPTION OF THE DRAWINGS

A detailed description of various embodiments is provided herein below with reference, by way of example, to the following drawings. It will be understood that the drawings are exemplary only and that all reference to the drawings is made for the purpose of illustration only, and is not intended to limit the scope of the embodiments described herein below in any way. For convenience, reference numerals may also be repeated (with or without an offset) throughout the figures to indicate analogous components or features.

DETAILED DESCRIPTION

The present disclosure relates to a protective headgear (e.g., football helmet) that can reduce the occurrence of concussions and the severity of subconcussive impacts to the brain of a wearer. Chronic traumatic encephalopathy can be caused by head injuries encountered during various sports and activities, for example while playing a game of American football. A protective headgear according to embodiments disclosed can reduce the magnitude of impacts to the head, brain and neck. Although the embodiments disclosed herein can be used in association with various applications, for clarity reasons the term "helmet" is being used to generally refer to the protective headgears described herein.

Figure 1:
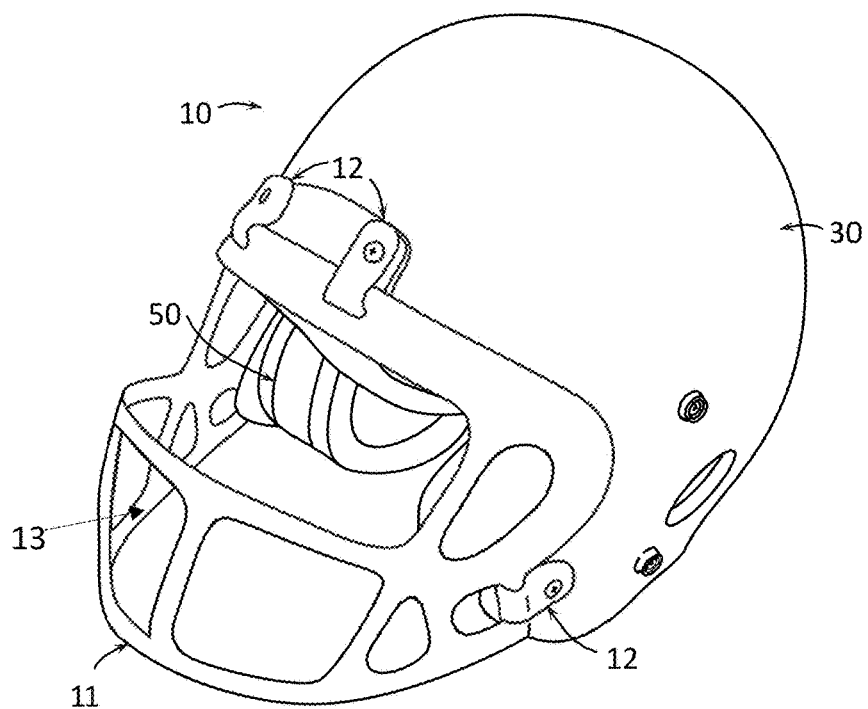
FIG. 1 depicts an illustrative example of a protective headgear according to some embodiments disclosed herein.
Figure 2:
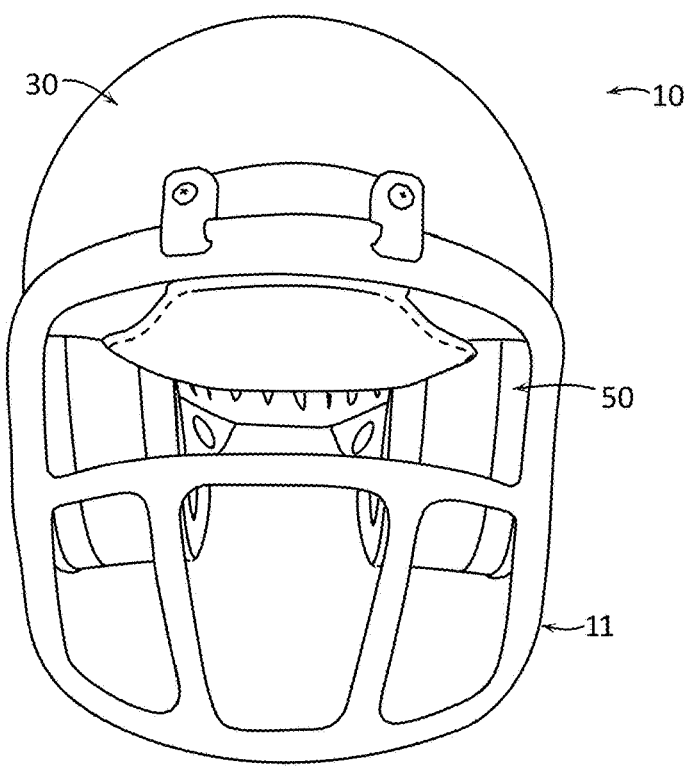
FIG. 2 depicts a front view of the protective headgear of FIG. 1.
Figure 3:
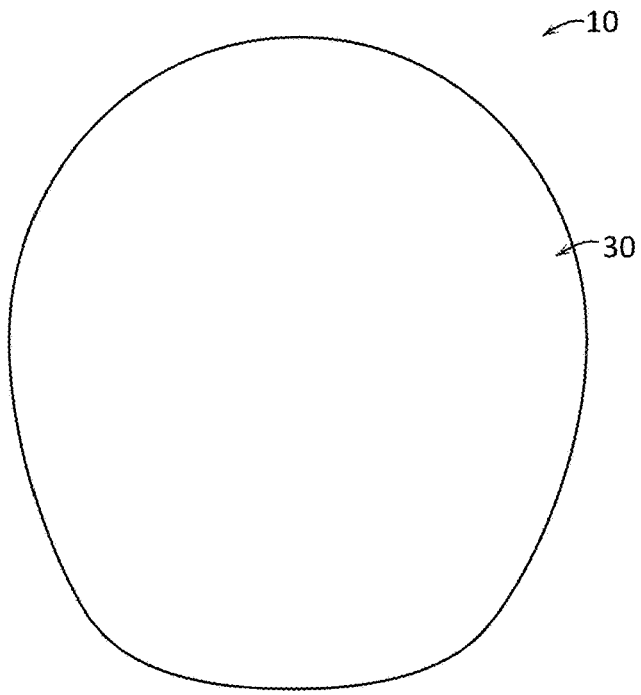
FIG. 3 depicts a rear view of the protective headgear of FIG. 1.

FIG. 1 is an illustration of a helmet 10 according to some embodiments disclosed herein. As shown in FIG. 1, a helmet 10 can include at least one of a core 40 (e.g., frame, shown in FIG. 11*c*), an exterior impact absorbing system (EIAS) 30 positioned on an exterior surface of the core 40, and an interior impact absorbing system (IIAS) 50 positioned on an interior surface of the core 40. The EIAS 30 can comprise one or more durable and compressible materials that surround the core. This configuration of the EIAS 30 can reduce the prevalence of elastic collisions and allow the EIAS 30 to dissipate some or all of the energy from an impact. The IIAS 50 layer of the helmet can also include one or more compressible materials. The IIAS layer 50 can be configured such that it can conform to a wear's head without leaving any significant gaps/spaces between the wearer's head and the IIAS (not shown). This configuration of the EIAS 30 can allow for absorption of some, most, or all of the force of an impact to a wearer's head. Although described as an exterior 30 layer and an interior 50 layer, each of the EIAS 30 and IIAS 50 can comprise one or more layers of materials. Further, the core can be coupled with any suitable number of layers.

As described in more details below, to reduce the prevalence of elastic collisions, the helmet can use a durable, yet easily compressible material over the exterior surface that is capable of substantially absorbing the force of an impact. The core layer of the helmet can be configured to provide structural support to the helmet and to protect a wearer against head injuries during high pressure impacts. Further, a compressible layer can be provided as the inner layer of the helmet. The inner layer can be configured such that it can conform to a wearer's head, thereby eliminating gaps between the lining and the wearer's head. The inner layer can also absorb the force of impact so that impacts are absorbed by both the outer and inner layers of the helmet.

The core 40 can comprise one or more layers of rigid or non-rigid and/or flexible materials. For example, in some embodiments, the core 40 can be more rigid than at least one of the EIAS 30 and IIAS 50. Alternatively or additionally, the core 40 can have a higher stiffness and/or a higher hardness than at least one of the EIAS 30 and IIAS 50. In some embodiments, at least one of the EIAS 30 and the IIAS 50 can have a rigidity of 0.73 psi/feet$^2$ (soft core), 0.93 psi/feet$^2$ (medium core), or 1.72 psi/feet$^2$ (firm core). Further, in some embodiments, the hardness, rigidity, and/or stiffness of the core can be a certain percentage greater than the hardness, rigidity, and/or stiffness of at least one of the EIAS 30 and IIAS 50.

The EIAS 30 can comprises one or more layers of materials. Generally, any suitable material or substance capable of absorbing impact energy can be used. The EIAS 30 can comprise one or more layers of materials. The number of layers used in the EIAS 30, the type of materials used, and/or the thickness of the layers used in the EIAS 30 can depend on the particular circumstances in which the helmet is expected to be used. For example, the number of the layers in the EIAS 30 can be a function of the weight and/or size of the wearer. Specifically, a helmet intended for use by larger/heavier wearer can include an EIAS 30 that is configured to dissipate a larger amount of impact energy than EIAS 30 that would be used in a helmet intended for use by a lighter/smaller wearer. Generally, the EIAS 30 can include any number of homogenous or non-homogenous layers.

Similarly, the IIAS 50 can comprise any number of layers. For example, in one embodiment, the IIAS 50 can comprise four layers of materials. Further, the number of layers used in the IIAS, the properties of the materials used in the IIAS, and/or the thicknesses of the various materials and layers of the IIAS can be adjusted as a function of the particular conditions in which the helmet 10 is expected to be used. For example, an IIAS that is capable of dissipating a larger amount of impact energy can be used in a helmet intended for use by a heavier/larger wearer than an IIAS that would be used in a helmet intended for use by a lighter/smaller wearer.

The IIAS 50 can be configured such that it absorbs the impact energy between a wearer's head and the core 40 without collapsing or exceeding its impact absorption capacity. Generally, the impact absorption capacity of the IIAS 50 can be dependent on a number of factors, such as the thickness of the IIAS, the number of layers used in the IIAS, and/or the properties of the layers used in the IIAS.

The IIAS 50 can be configured and customized for use by a particular wearer, for example to accommodate the wearer's weight, by for example, changing the density of the materials used in the IIAS 50. For example, as noted above, the density of the materials used in an IIAS 50 of a helmet intended for use by a heavier/larger wearer can be higher than the density of the materials used in the IIAS 50 of a helmet intended for use for a smaller/thinner wearer. Additionally or alternatively, the density of the IIAS 50 can be increased, locally, near an area where the IIAS 50 is fixed to the core 40.

Referring back to FIG. 1, the helmet 10 can include a facemask 11 having a plurality of elongate bars 13. It should be noted that although referred as bars, the elongate bars 13 can be of any form or shape. For example, the elongate bars 13 can have cylindrical, conical, near cylindrical, and/or near conical cross sections.

The facemask 11 can be attached to the helmet 10 using any suitable technique available in the art. For example, the facemask 11 can be attached to the helmet 10 using one or more fasteners 12. The fasteners 12 can be any suitable fastener, for example one or more screws or one or more fastener-snaps. In some implementations, the fasteners 12 can be configured such that at least one fastener 12 can break away in response to application of a certain level of force or tension to the helmet 10. The facemask 11 can be attached to the helmet using a removable and/or replaceable connection that allows the facemask 11 to be opened (e.g., to allow the wearer to wear the helmet and/or configure the facemask 11 as needed) and/or completely removed from the helmet.

In some embodiments, the facemask 11 can comprise a fiber reinforced polymer, which has been modified to withstand any expected impact forces on the facemask without failure. For example, the facemask can comprise a carbon fiber reinforced polymer. The carbon fiber reinforced polymer (hereinafter generally referenced as "carbon fiber") can generally comprise carbon fiber filaments that have been combined with a resin to create a solid material. The carbon fiber reinforced polymer used in the facemask 11 can be configured such that it comprises a relatively high stiffness and high tensile strength for its weight.

In some embodiments, the carbon polymer can also be configured such that much of its strength is directional. Specifically, the carbon fiber can be configured such that its strength is dependent on the orientation of the individual filaments used therein. This configuration can result in the carbon fiber being very strong in a first direction, while being very brittle in a second direction. For example, the carbon polymer can be configured such that at least about 60%, 70%, 80%, or 90% of the carbon fiber filaments are oriented along the axes of the elongate bars 13. The term "axes of the elongate bars," as used herein is intended to refer to the general elongate direction of each segment of the elongate bars 13, and one of ordinary skill in the art should appreciate that the bars are not necessarily perfectly cylindrical or round in cross section. This configuration of the carbon fiber filaments in the elongate bars 13 can allow the facemask 11 to withstand impacts that load the elongate bars 13 in the axial direction, and thereby optimizes the strength of the facemask 11. The facemask can be configured to have any suitable hardness, for example, depending on the application, a hardness of at least about 13 Shore C to at least about 43 Shore C or at least about 23 Shore C to at least about 33 Shore C.

Carbon fiber filaments can often be weak, brittle, and/or prone to cracking when impacted in a direction normal to their elongate axis. In some embodiments, the facemask can include a rubberized carbon filament. The rubberized carbon filament can serve as a light weight carbon fiber that provides adequate flexibility to withstand impacts.

The carbon filaments can comprise any suitable material available in the art, for example any suitable resin (e.g., laminating resin, such as PRO-SET® laminating epoxy) and/or any suitable rubberizing compound (e.g., G-Flex rubberizing compound). The rubberizing compound can be combined with the resin to increase the flexibility of the facemask 11 to impacts that are normal to the axial direction of the elongate bars. For example, in some embodiments, the filaments can comprise at least about 30%-50% epoxy laminating resin, at least about 40% epoxy laminating resin, or at least about 35% epoxy laminating resin and/or at least about 50-70% rubberizing compound by weight, at least about 60% rubberizing compound by weight, and at least about 65% rubberizing compound by at least one of weight or volume.

The resin used to bond the carbon fiber filaments can have a hardness of approximately 6.50 on a 0 to 10 scale, where 10 is the hardness of a metal facemask. The term "approximately" as used herein denotes the stated value along with a variation of at most 10% in the positive or negative direction. While specific combinations of epoxy laminating resin and rubberizing compound have been disclosed herein, other suitable types of rubberizing compounds and flexibility promoters are known in the art and can be substituted in the construction of the facemask 11.

Figure 4:
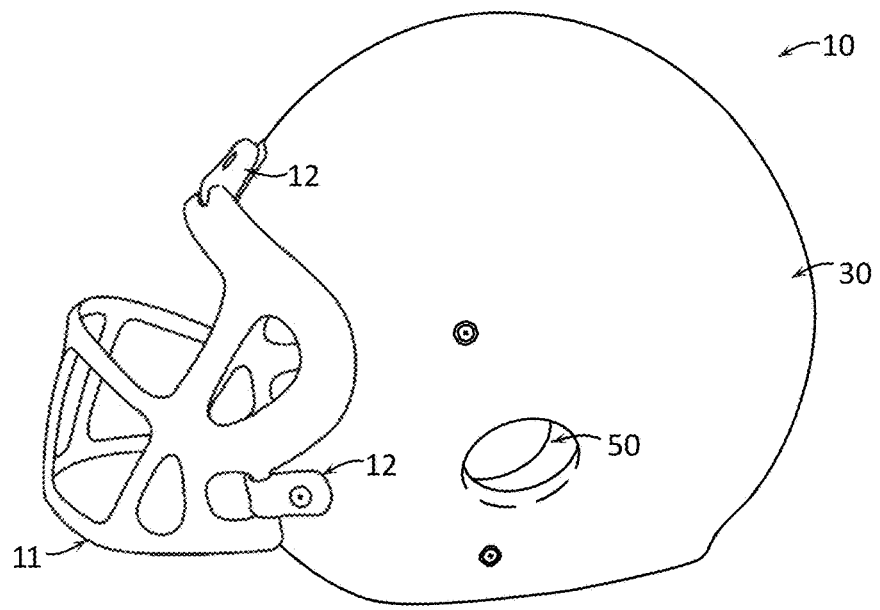
FIG. 4 depicts a side view of the protective headgear of FIG. 1.
Figure 5:
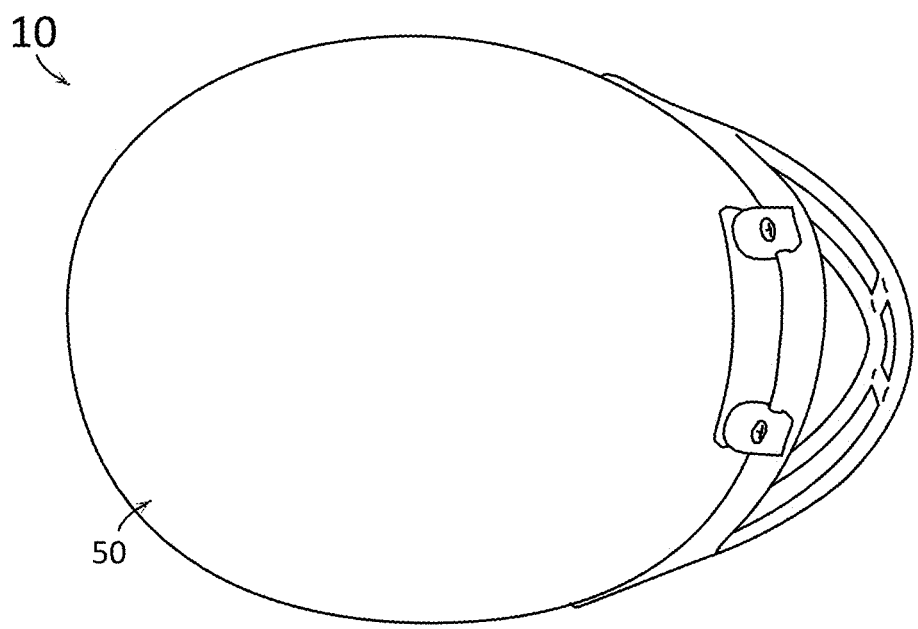
FIG. 5 depicts a top view of the protective headgear of FIG. 1.

FIGS. 2-5 depict a front view, a rear view, a side view, and a top view of the protective headgear of FIG. 1, respectively. As shown in FIG. 4, the EIAS 50 can reduce in thickness towards the edges of the helmet or in the vicinity of the wearer's ear, such that the EIAS 50 has a rounded convex cross section if viewed from the side. This rounded cross section can protect the wearer from the edge of the core 40 (such that the wearer's skin does not come in direct contact with the core during use) and prevent articles from placing a tangential load on the EIAS 30 in those areas. For example, in the vicinity of the wearer's ear (e.g., within a predetermined distance from the vicinity of the earhole), the thickness of the EIAS can be reduced by about 40%. As noted in more details below, the protective headgear can include an acoustic foam that is configured to reduce or partially block environmental noise.

Figure 6:
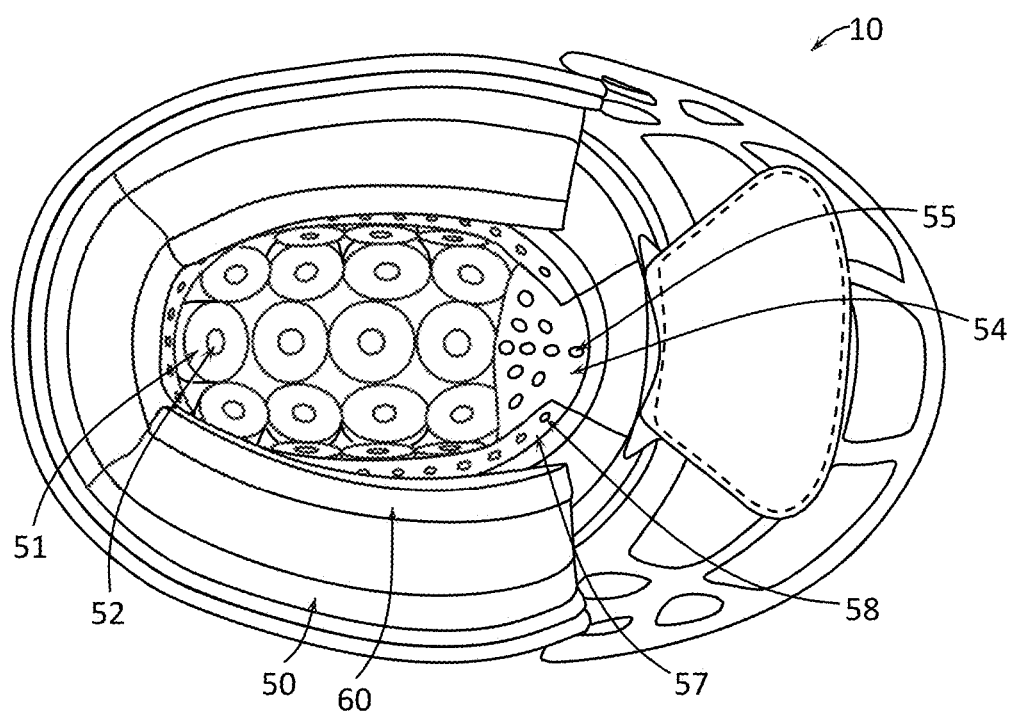
FIG. 6 depicts a bottom view of the protective headgear of FIG. 1.

FIG. 6 is a bottom view of the helmet 10, with various components removed to expose the IIAS 50. As shown in FIG. 6, the IIAS 50 can include a plurality of impact absorbing components 51. Depending on the application in which the helmet 10 is being used, these impact absorbing components 51 can be placed in various locations with the IIAS 50. For example, as shown in FIG. 6, the IIAS 50 can include a plurality of impact absorbing components 51 on or near the top of the helmet 10. These impact absorbing components 51 can comprise any shape, form, and/or material. For example, the impact absorbing components can comprise one or more generally cylindrical-shaped, modified cylindrical-shaped, or generally conical-shaped impact absorbing components 51. Further, in some embodiments, the impact absorbing components 51 can comprise foam or any other suitable material with adequate impact absorbing properties and/or contouring properties. The impact absorbing components 51 can further comprise at least one of fluid-filled bladders (e.g., gas-filled, liquid-filled, semifluid-filled, semisolid bladders), vinyl encased impact absorbing members, and/or mechanical shock absorbing components.

In some embodiments, the impact absorbing components 51 can comprise cylindrical-shaped impact absorbing components having at least one cylindrical hole 52, oriented along the same axis as the foam cylinder 51. The cylindrical hole 52 can be oriented along the same axis of the foam cylinder 51 and/or be offset relative to that axis. The offsetting of the axes can be used to change the compressive properties of the impact absorbing components 51, without having to change their material, diameter, and/or height. For example, in some embodiments, the cylindrical hole 52 can be offset by an angle in a range of about 0° to about 30° degrees relative to the axis, along which a foam cylinder 51 is disposed.

Further, the cylindrical holes 52 can be configured as through holes that extend from one end of the foam cylinder 51 to the other. The cylindrical holes 52 can also be configured as countersunk holes, where their depth is less than the height of the foam cylinder 51. Alternatively or additionally, the cylindrical holes 52 can be countersunk from either directions. Further, the impact absorbing components 51 can have more than one cylindrical hole 52 to reduce the weight of the foam cylinder and to change its impact absorption properties. Furthermore, the impact absorbing components 51 can have a centrally located cylindrical hole 52 and a plurality of smaller holes that extend along the radial direction from the centrally located cylindrical hole. It should be noted that while the hole has been described as cylindrical for ease of manufacture, holes or voids of other shapes can be substituted. Further, the cylindrical hole 52 can be configured such that they do not extend to either end of the impact absorbing components 51 and, instead, function as an internal void.

Referring back to FIG. 6, the helmet 10 can comprise a forehead pad 54 in the portion of the helmet that contacts the wearer's forehead and one or more elongate strips 57 that are disposed on the sides of the wearer's head. The forehead pad 54 can comprise one or more impact absorbing components 55. In some embodiments, the impact absorbing components can be formed in the forehead pad 54 as one or more perforations or holes. Similarly, the one or more elongate strips 57 can comprise one or more impact absorbing components 58. In some embodiments, these impact absorbing components 58 can be formed in an elongate strip 57 as one or more perforations or holes. The forehead pad 54 can be disposed adjacent the inside of the core 40, the impact absorbing components 51, and the elongate strips 57.

Figure 9:
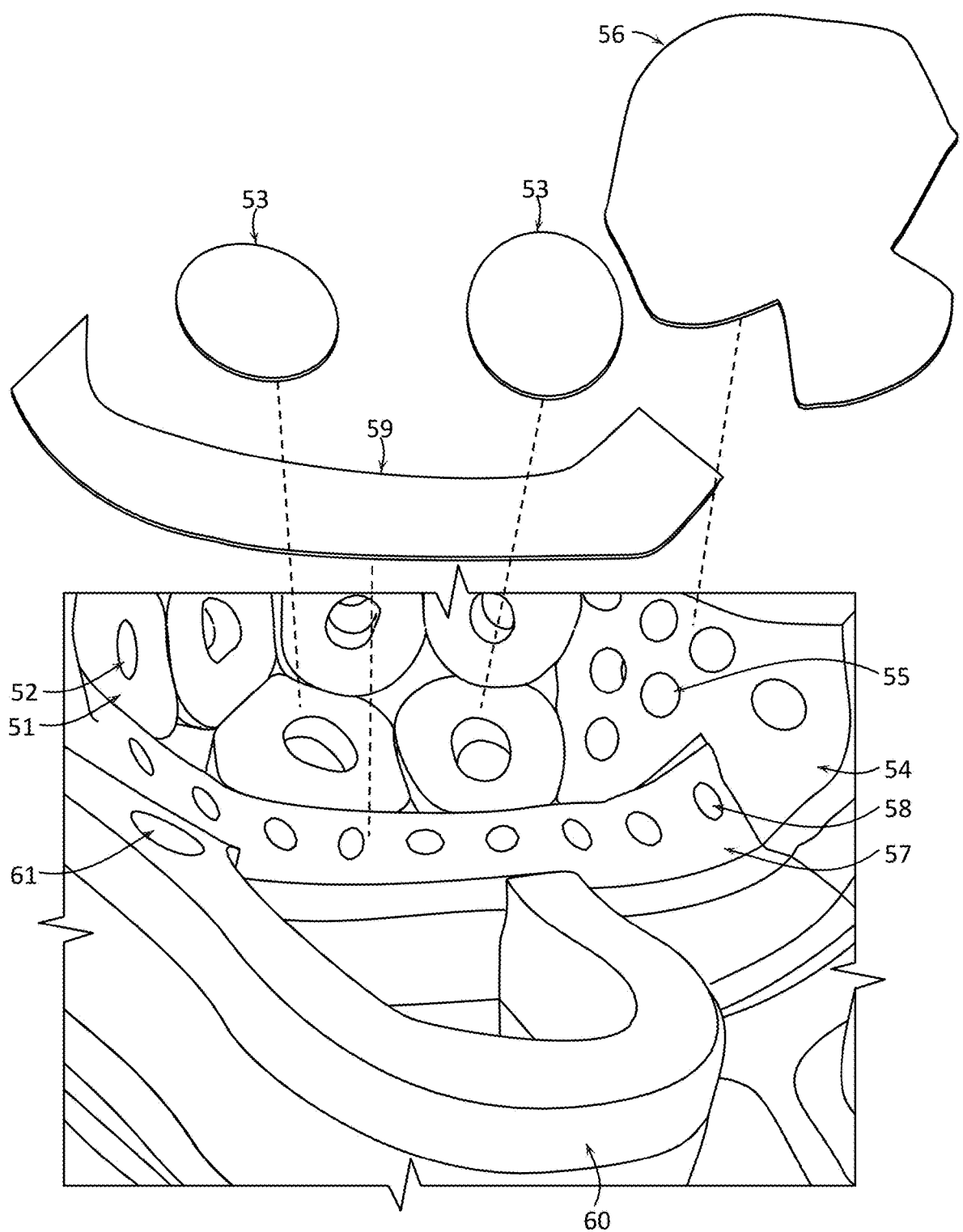
FIG. 9 depicts an inside view of a section of a protective headgear according to some embodiments disclosed herein.
Figure 10:
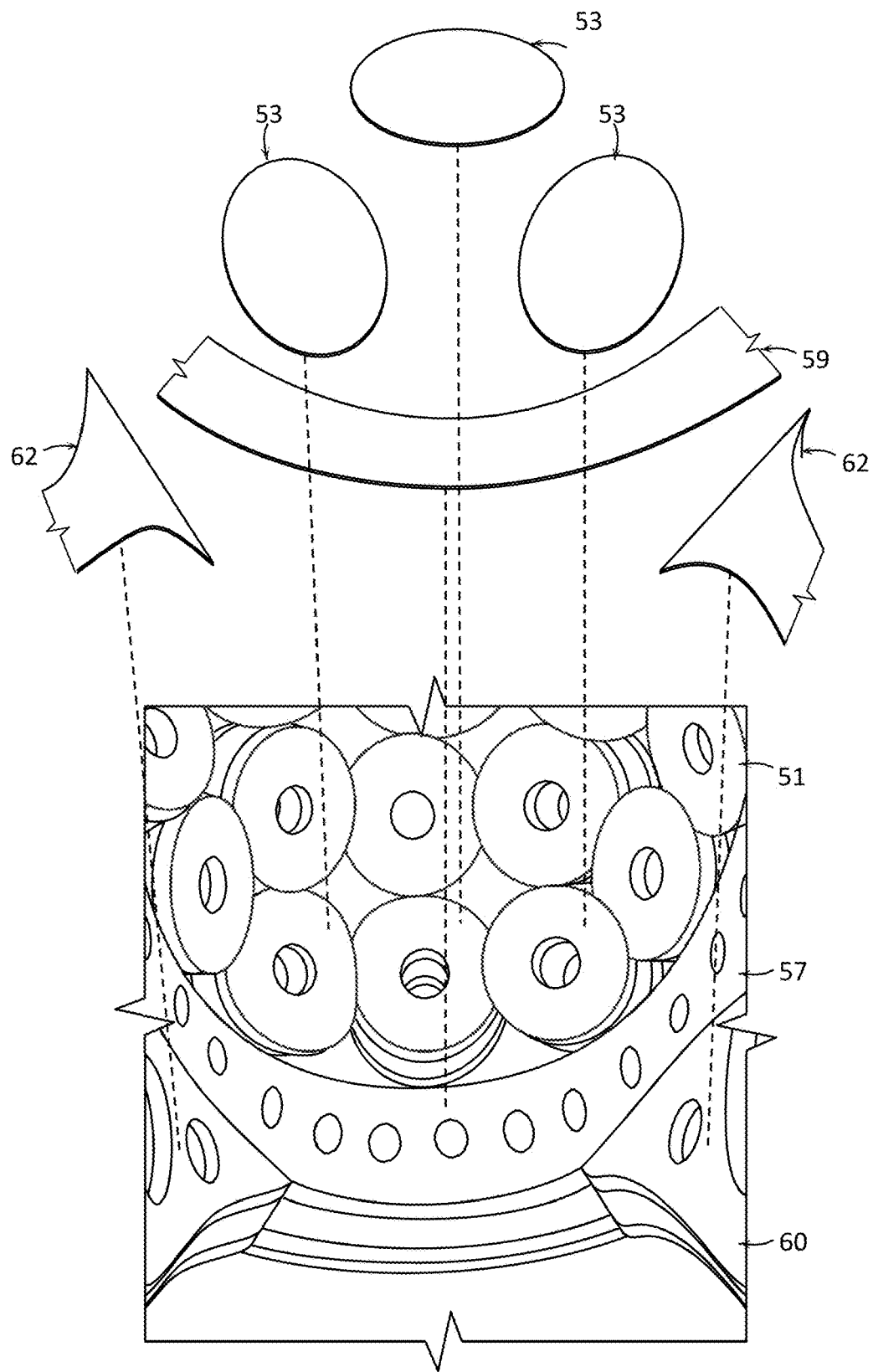
FIG. 10 depicts an inside view of a section of a protective headgear according to some embodiments disclosed herein.

Further, the helmet 10 can comprise one or more ear strips 60 that are positioned in an area below the locations the wearer's ears are expected to be positioned, between the rigid core 40 and the wearer's head. The ear strips 60 can be a part of the IIAS and/or can be configured such that they can be separated from the IIAS. The one or more ear strips can generally comprise similar structure and materials as the IIAS. For example, the one or more ear strips 60 can also comprise one or more impact absorbing components 61 (shown later in FIG. 9) and/or an impact absorbing material. In some embodiments, these impact absorbing components 61 can be formed in an ear strip 60 as one or more perforations or holes. The impact absorbing components 55, 58, 61 of the forehead pad 54, the elongate strips 57, and the ear strips 60 can be generally configured similar to the impact absorbing components 51 of the IIAS 50. For example, the impact absorbing components 55, 58, 61 can be configured as through holes, countersunk from either directions, and/or internal voids.

Figure 7A:
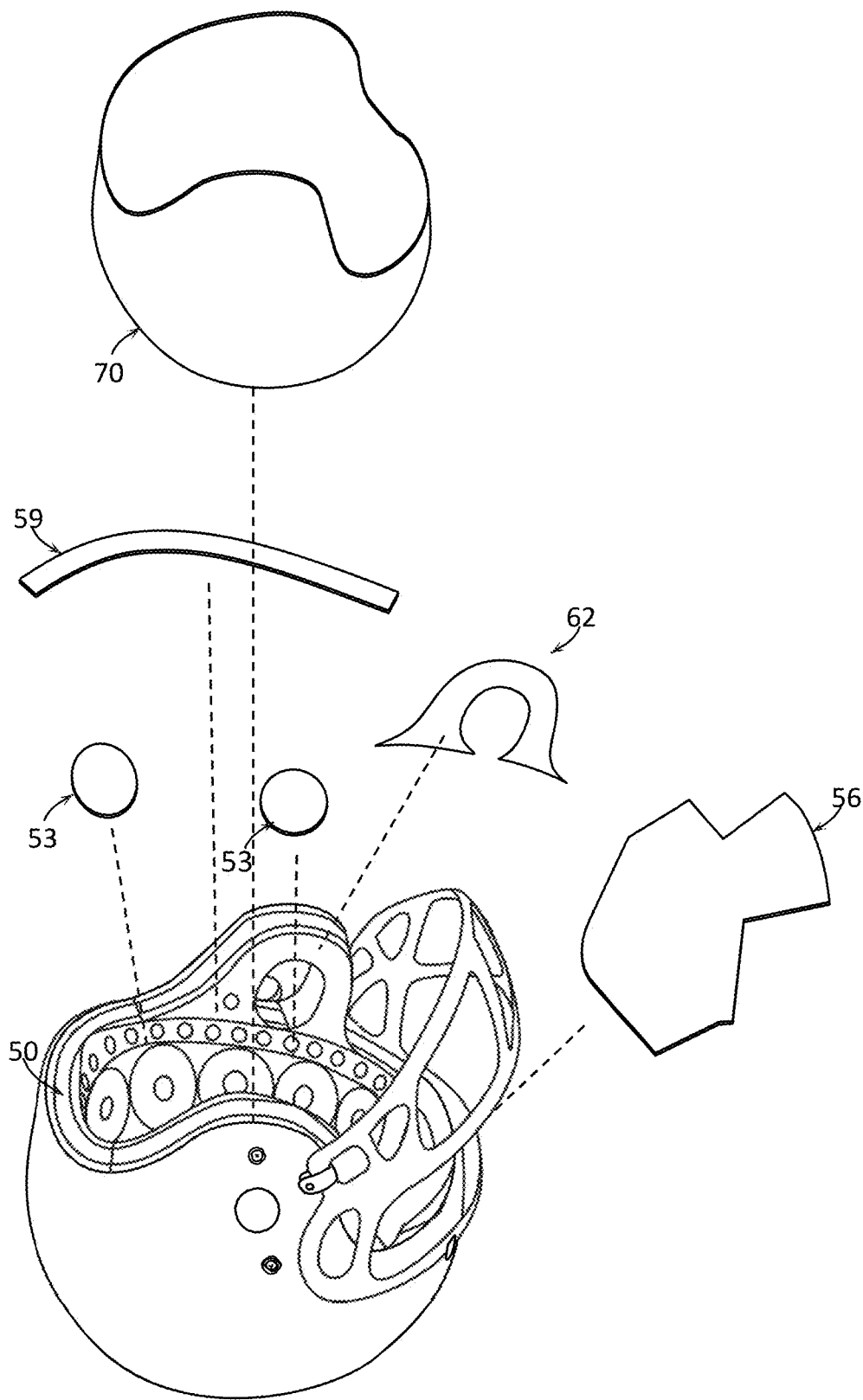
FIG. 7*a* depicts an exploded view of the protective headgear of FIG. 1.

FIG. 7a depicts an exploded view of the helmet 10 shown in FIG. 1. As shown, each individual impact absorbing component 51 in the IIAS 50 can have a barrier layer 53 fixed to the end of the impact absorbing component 51 that is furthest from the core 40 (i.e., such that the impact absorbing components 51 are fixed to the core on one end and to the barrier layer 53 on the other end). The barrier layer 53 can be configured to partially or fully block the flow of environmental elements, such as air, fluid, or gases that may be present in the ambient, and are brought in intentional or incidental contact with the helmet 10.

The forehead pad 54, elongate strips 57, and/or the ear strips 60 can also be configured such that they are fixed to the core 40 on one end (i.e., their respective proximal end) and to a corresponding barrier layer 56, 59, and 62 on their respective distal end. The barrier layers 53, 56, 59, 62 can comprise a substantially air impermeable layer. Alternatively or additionally, the barrier layers 53, 56, 59, 62 can comprise a vinyl material.

The barrier layers 53, 56, 59, 62 can be fixed to the IIAS 50 using any suitable scheme known in the art. For example, the barrier layers 53, 56, 59, 62 can be fixed to the IIAS 50 using at least one adhesive.

In some embodiments, the barrier layers can comprise a plastic sheet adhered to the impact absorbing material. Additionally or alternatively, the barrier layers can be a unitary article fixed to each foam section of the underlying IIAS 50. Further, the barrier layers can be air permeable or partially air permeable, thereby allowing an amount of air to pass through the barrier layers.

The barrier layers can be configured to allow air beyond a certain pressure to pass through or permeate through the barrier layer. Further, the IIAS, the impact absorbing component 51 or other portions of the IIAS 50 can be configured to allow air beyond a certain pressure to pass through or permeate the material. Additionally or alternatively, the impact absorbing components 51 or other portions of the IIAS 50 can be configured to allow air beyond a first pressure to pass through or permeate its respective material and the barrier layers can be configured to allow air beyond a second pressure to pass through or permeate its material, where the first pressure can be lower than the second pressure. For example, the second pressure can be between and including 1 and 100 greater the value of the first pressure.

The barrier layers can be configured such that they increase the effectiveness of the IIAS 50 by utilizing any air trapped in the holes of the impact absorbing components 52, 55, 58, 61 to absorb impact energy. In some embodiments, the impact absorbing members 51, 54, 57, 60 can comprise an open cell foam and the barrier layers can comprise a substantially air impermeable material. When the impact absorbing members 51, 54, 57, 60 comprise an open cell foam, the air contained in the holes 52, 55, 58, 61 can only enter or exit the hole through the open cell structure of the foam, thereby providing an impact absorbing benefit. Further, utilizing substantially air impermeable barrier layers can allow the impact absorbing members 51, 54, 57, 60 to absorb impact energy by regulating the air flowing in and out of the holes 52, 55, 58, 61.

In some embodiments, the impact absorbing members 51, 54, 57, 60 can comprise an open cell foam and the barrier layers can comprise a partially air permeable layer. The barrier layers can comprise a partially-permeable or semi-permeable material with respect to air that can be configured to reduce the shock absorbing effect or total capacity for impact absorption of the IIAS 50. When the barrier layers are partially permeable, the air contained in the holes 52, 55, 58, 61 can exit through the open cell structure of the foam or the permeable structure of the barrier layers, thereby allowing the air to escape at a greater rate.

The shock absorbing effect of the IIAS 50 can also be modified by changing the materials used in the IIAS 50 and the relationship between the size of holes 52, 55, 58, 61 relative to their respective impact absorbing members 51, 54, 57, 60. For example, increasing the diameter of the holes 52, 55, 58, 61 relative to the size of their respective impact absorbing member 51, 54, 57, 60 can reduce the lateral distance that the air contained in the holes 52, 55, 58, 61 travels through the impact absorbing member 51, 54, 57, 60 before escaping. By reducing the lateral distance, the air contained in the holes 52, 55, 58, 61 can escape more easily, therefore reducing the impact absorbing capacity of the IIAS 50.

The shock absorbing effect of the IIAS 50 can also be modified by changing the lateral width of the impact absorbing members 51, 54, 57, 60 relative to the diameter of the holes 52, 55, 58, 61, thereby changing the property of the materials used in the IIAS 50 and changing the thickness of the materials used in the IIAS 50.

The ratio of the diameters of the holes 52, 55, 58, 61 relative to the lateral width of the impact absorbing members 51, 54, 57, 60 can be any suitable ratio, for example, in a range of about 1:1.5 to about 1:10. For example, the diameters of the holes 52, 55, 58, 61 can be in a range of about 0.2 inches to about 0.7 inches, and the lateral width of the impact absorbing members 51, 54, 57, 60 can be in a range of about 1 inch to about 8 inches.

Referring back to FIG. 7a, the helmet 10 can also include a liner 70. The liner 70 can be removably and replaceably connected to the interior of the helmet 10 (e.g., the edge of the helmet 10). For example, the liner can be attached with a fastener (e.g., a Velcro® fastener) at the edge of the helmet 10 to the core. The liner 70 can comprise an elastic material that provides some impact absorption. For example, the liner 70 can be configured such that it absorbs about 0.3% of the total impact on the helmet.

The removable liner 70 can comprise any suitable material known in the art. For example, the removable liner 70 can comprise at least one of: a material that provides a wicking effect, a material that provides an anti-bacterial effect, a material that provides an anti-microbial effect, and a material that functions as a moisture barrier.

In some embodiments, the removable liner 70 can comprise polyester, spandex and cotton. For example, the removable liner can comprise about 72% to about 92% polyester, about 5% to about 11% spandex, and about 5% to about 15% cotton. In some embodiments, the removable liner can comprises about 80% to about 84% polyester, about 6% to about 10% spandex, and about 8% to about 12% cotton. Further, the spandex content of the liner can be configured such that it provides impact absorption benefits.

Figure 7B:
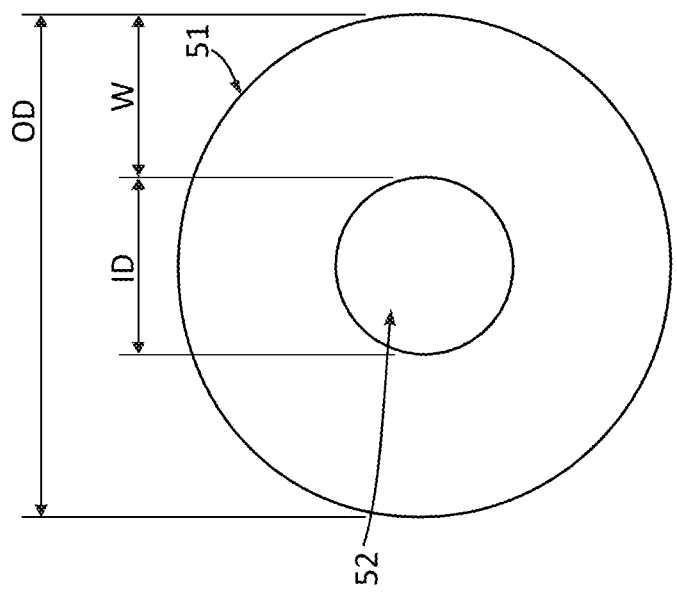
FIG. 7*b* depicts a schematic illustration of a cross-section of an impact absorbing component according to some embodiments disclosed herein.
Figure 7C:
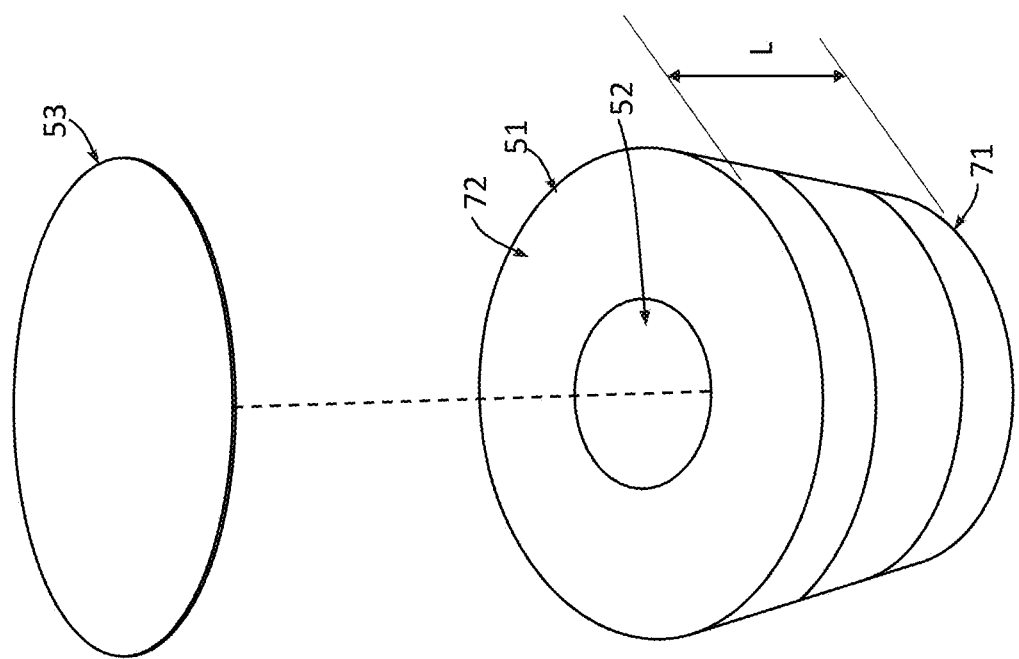
FIG. 7*c* depicts a schematic illustration of an impact absorbing component according to some embodiments disclosed herein.
Figure 7E:
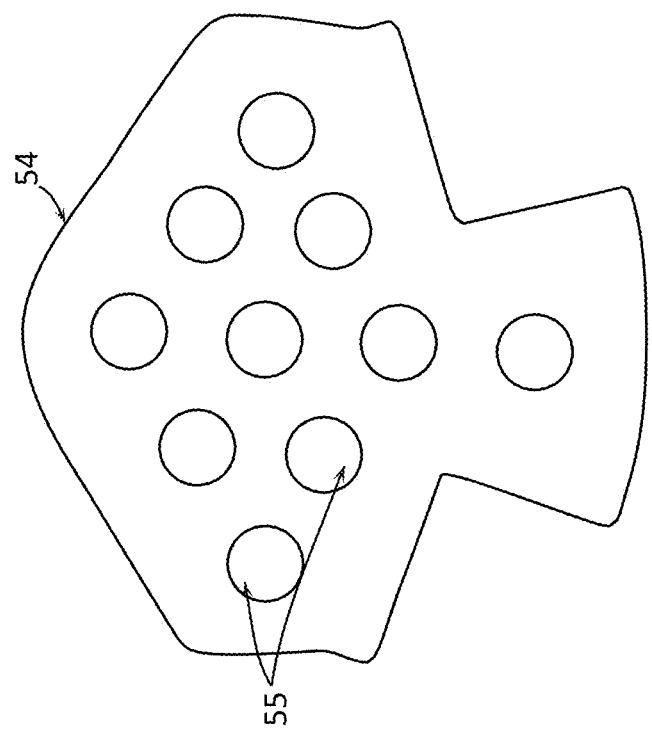
FIG. 7*e* depicts another schematic illustration of an interior portion of a helmet according to some embodiments disclosed herein.
Figure 7D:
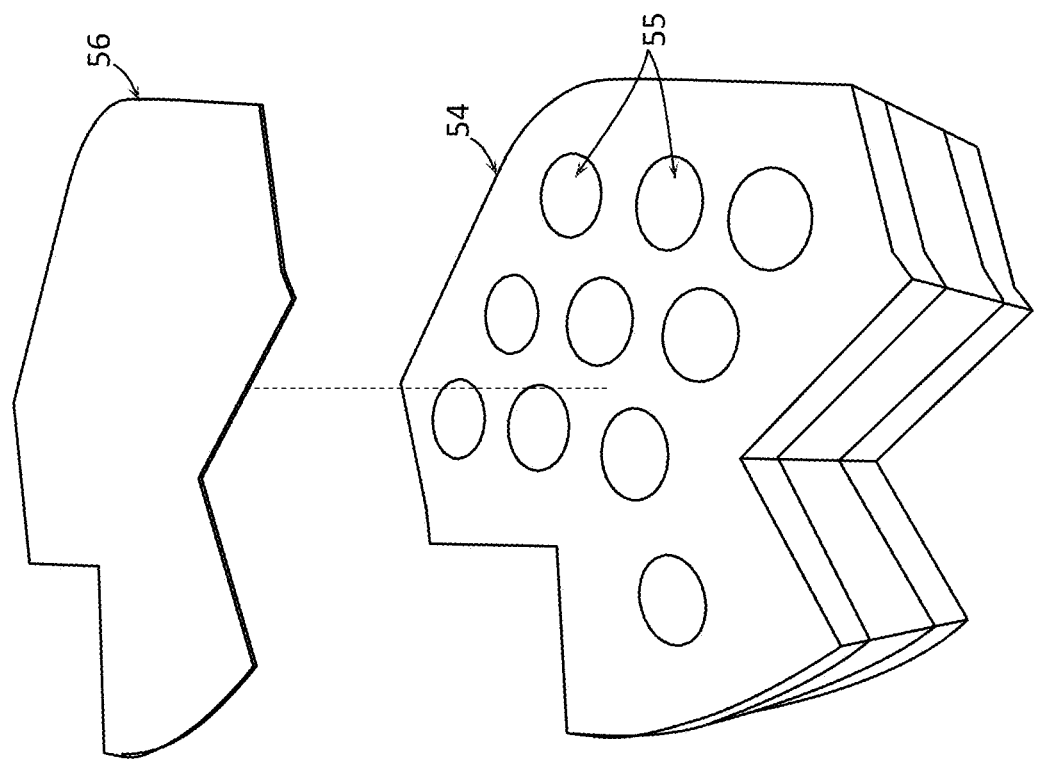
FIG. 7*d* depicts a schematic illustration of an interior portion of a helmet according to some embodiments disclosed herein.
Figure 7F:
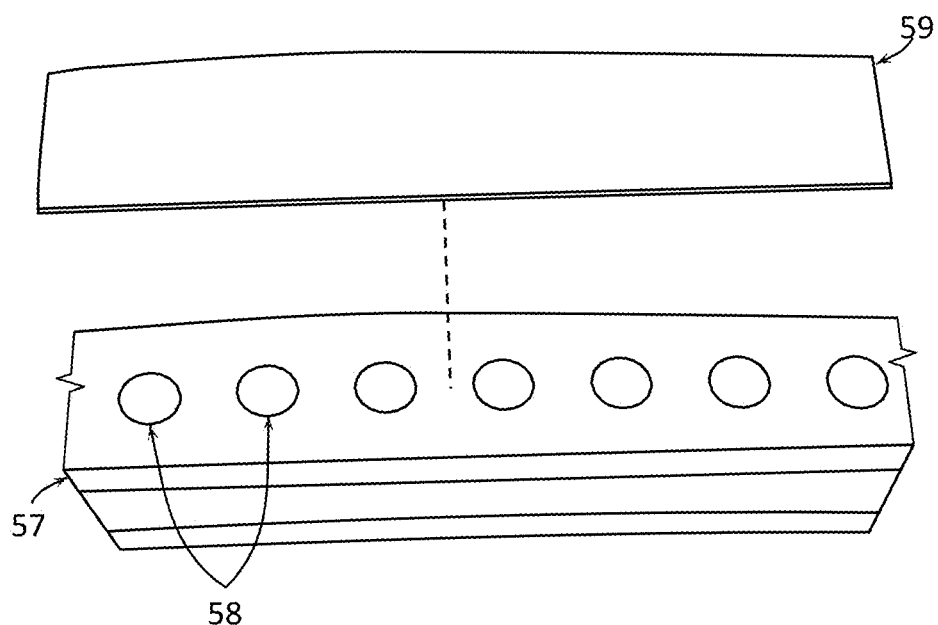
FIG. 7*f* depicts yet another schematic illustration of an interior portion of a helmet according to some embodiments disclosed herein.

As noted, the impact absorbing components 51 can assume any suitable shape and/or form and can comprise any suitable material. FIGS. 7b-8f provide detailed views of three types of foam components that can be used in impact absorbing components 51 in the IIAS 50. Specifically, FIGS. 7b-7c depict an example of a cylindrical foam-shaped impact absorbing component 51 with the barrier layer 53 removed. FIGS. 7d-7e depict an example of a forehead pad 54 with the barrier layer 56 removed. FIG. 7f depicts an example of an elongate pad 57 with the barrier layer 59 removed.

As shown in FIGS. 7b-7c, the wall thickness, denoted by W in FIG. 7b, can be half the difference between the outside diameter, denoted by OD in FIG. 7b, and the inside diameter, denoted by ID in FIG. 7b. The distance between the first end 71 and the second end is denoted by the length L in FIG. 7c.

The example of a foam cylinder 51 in FIG. 7c comprises an outside diameter OD and inside diameter ID with a circular cross-section, however, it is appreciated that a non-circular cross-section can be used, where the wall thickness W can be measured as the distance between an inside surface and an outside surface. The wall thickness W can be varied by changing various parameters of the foam cylinders 51, including but not limited to, changing the outside diameter OD and/or the inside diameter.

The foam cylinders 51 can have a length L. Generally, the length L can be any suitable length. For example, the length L can be between and including about 0.2 inches to 2 inches, between and including about 0.5 inches to 1.7 inches, between and including about 1 inch to 1.5 inches, between and including about 1.2 inches to 1.5 inches, between and including about 1.3 inches to 1.4 inches, or about 1.375 inches.

The foam cylinders 51 can also have any suitable outside diameter OD. For example, the outside diameter OD can be between and including about 0.2 inches to 3.0 inches, between and including about 0.2 inches to 3.0 inches, between and including about 0.5 inches to 2.5 inches, between and including about 1 inch to 2 inches, between and including about 1.3 inches to 1.7 inches, between and including about 1.4 inches to 1.6 inches, or about 1.5 inches.

Similarly, the foam cylinders 51 can have an inside diameter ID of suitable size. For example, the inside diameter ID can be between and including about 0.05 inches to 2.9 inches, between and including about 0.08 inches to 2 inches, between and including about 0.1 inches to 1.5 inches, between and including about 0.2 inches to 1 inch, between and including about 0.3 inches to 0.8 inches, between and including about 0.4 inches to 0.6 inches, between and including about 0.4 inches to 0.6 inches, or about 0.5 inches.

The inside diameter ID of the foam cylinder 51 can be determined based as a ratio of the outside diameter OD of the foam cylinder 51. For example, the inside diameter ID of the foam cylinder 51 can be between about $10^{-4}$ to 1 times the outside diameter OD, is between and including about 0.1 times and 0.9 times the outside diameter OD, between and including about 0.15 times and 0.75 times the outside diameter OD, between and including about 0.2 times and 0.6 times the outside diameter OD, between and including about 0.25 times and 0.4 times the outside diameter OD, between and including about 0.3 times and 0.36 times the outside diameter OD, between and including about 0.32 times and 0.34 times the outside diameter OD, or about 0.33 times the outside diameter OD of the foam cylinder 51.

In some embodiments, the foam cylinder 51 can comprise at least three layers of a viscoelastic foam. The first layer of viscoelastic foam can begin on the first end 71 and comprise a hard firmness foam with a length in the direction between the first end 71 to the second end 72 (e.g., between and including 0.5 inches to 0.8 inches or between and including 0.6 inches to 0.8 inches). The second layer of viscoelastic foam can be fixed to the first layer and can comprise a medium firmness foam with a length in the direction between the first end 71 to the second end 72 (e.g., between and including about 0.2 inches to 0.6 inches and a density between and including about 0.25 pounds per cubic foot to about 15 pounds per cubic foot). The third layer of viscoelastic foam can be fixed to the second layer and comprise a soft firmness foam with a length in the direction between the first end 71 to the second end 72 (e.g., between and including about 0.25 inches to 0.375 inches).

The hard firmness foam can comprise any suitable firmness. For example, the hard firmness foam can be in a range of about 1.14 pounds per square inch per square foot ("psi/sq. ft.") to about 1.30 psi/sq. ft., in a range of about 1.22 psi/sq. ft. to about 1.32 psi/sq. ft., in a range of about 0.85 psi/sq. ft. to about 0.95 psi/sq. ft., in a range of about 0.88 psi/sq. ft. to about 0.98 psi/sq. ft., in a range of about 0.65 psi/sq. ft. to about 0.73 psi/sq. ft., or in a range of about 0.68 psi/sq. ft. to about 0.78 psi/sq. ft.

Similarly, the hard firmness viscoelastic foam can comprise any suitable thickness. For example, the hard firmness viscoelastic foam can comprise a thickness of between and including about 0.2 inches to 0.8 inches, a thickness of between and including about 0.4 inches to 0.6 inches, a thickness of between and including 0.2 inches to 0.8 inches, a thickness of between and including about 0.4 inches to 0.6 inches, a thickness of between and including 0.125 inches to 0.5 inches, or a thickness of between and including 0.35 inches to 0.45 inches. The hard firmness viscoelastic foam can comprise, for example, a density of between and including about 0.5 pounds per cubic foot to 5 pounds per cubic foot, a density of between and including about 1.2 pounds per cubic foot to 1.3 pounds per cubic foot, a density of between and including 0.5 pounds per cubic foot to 5 pounds per cubic foot, a density of between and including about 0.9 pounds per cubic foot to 1 pound per cubic foot, a density of between and including 0.5 pounds per cubic foot to 5 pounds per cubic foot, a density of between and including 0.88 pounds per cubic foot to 0.98 pounds per cubic foot. The hard firmness viscoelastic foam can further comprise, for example, a pore concentration of between and including 600 pores per cubic inch to 1,100 pores per cubic inch, a pore concentration of between and including 800 pores per cubic inch to 900 pores per cubic inch, a pore concentration of between and including 860 pores per cubic inch to 1,360 pores per cubic inch, a pore concentration of between and including 1,060 pores per cubic inch to 1,160 pores per cubic inch, a pore concentration of between and including 880 pores per cubic inch to 1,380 pores per cubic inch, a pore concentration of between and including 1,080 pores per cubic inch to 1,180 pores per cubic inch. The term "pore," as used herein, can refer to any cell or opening contained within the viscoelastic foam structure, even if interconnected with an adjacent pore.

Figure 7H:
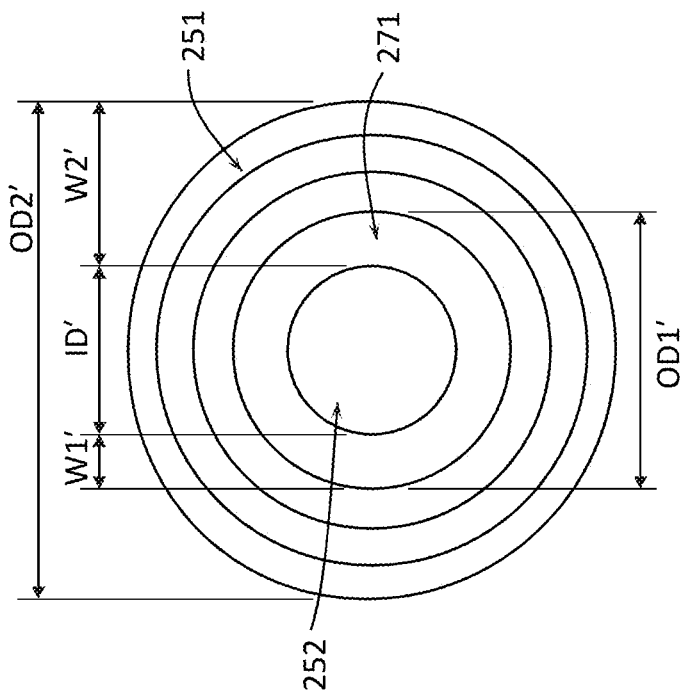
FIG. 7*h* depicts a schematic illustration of a cross-section of the impact absorbing component shown in FIG. 7*g*.
Figure 7G:
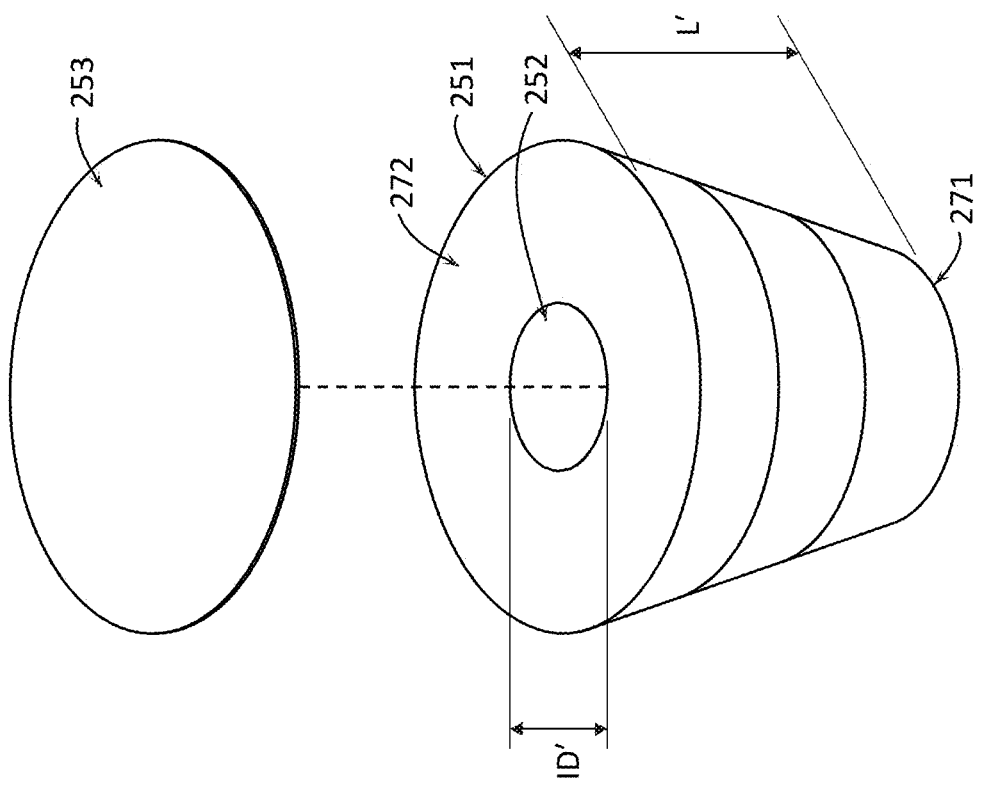
FIG. 7*g* depicts a schematic illustration of an impact absorbing component according to some embodiments disclosed herein.

Alternatively or additionally, impact absorbing components, such a modified version of the foam cylinder 51, can be used to further tune or enhance the properties of the IIAS 50. FIGS. 7g-7h depict an example of a conic foam impact-absorption element 251 (hereinafter "conic element") with a barrier layer 253 removed. The conic elements 251 can be used as an impact absorption component in any suitable area of the IIAS 50. The use of a conic element 251 can provide additional adjustability in the impact absorption qualities of the IIAS 50 and also provide further resistance to bottoming out during an impact.

The conic element 251 can have a first end 271 fixed to the core 40 and a second end 272 opposite the first end. The conic elements 251 can also have an external diameter that varies by some amount between the first end 271 and the second end 272. For example, the ratio of the external diameters at the first end 271 and the second end 272 can be in a range of about 0.4 to about 0.95. The variance in diameter can be linear but does not necessarily need to be linear. The conic elements can also include an axial opening 252 oriented along the same axis as the conic element 251. The axial opening 252 is preferably oriented along the same axis of the conic element 251, but there are situations where it may be preferable to offset the axes. For example, offsetting the axes can be used to change the compressive properties of the conic elements 251, without having to change their material, diameter, or height.

The axial opening 252 can be configured as one or more through holes that extend from the first end 271 of the conic element 251 to the second end 272. The axial openings 252 can also be configured as countersunk holes where their depth is less than the height of the conic element 251. For example, the axial openings 252 can also be countersunk from either direction. Further, the conic elements 251 can have more than one axial opening 252 to reduce the weight of the conic element 251 and to change its impact absorption properties. Alternatively or additionally, the conic elements 251 can have a centrally located axial opening 252 and a plurality of smaller holes located in the radial direction from the centrally located axial opening 252. Further, the axial opening 252 can be shaped cylindrically, conically, or in the shape of any appropriate hole or void. For example, the axial opening 252 can be configured such that it does not extend to either end of the conic elements 251 and, instead, is an internal void.

The conic elements 251 can have a variance in wall thickness at some point between the first end 271 and the second end 272. The distance between the first end 271 and the second end 272 is denoted by the length L' in FIG. 7g. The outside diameter of the conic element 251 at the first end is denoted by OD' in FIG. 7h. The outside diameter of the conic element 251 at the second end is denoted by OD2' in FIG. 7h. The inside diameter of the conic element 251 is denoted by ID' in FIGS. 7g-7h. The wall thickness at the first end 271, denoted by W1' in FIG. 7h, is half the difference between OD1' and ID'. The wall thickness at the second end 272, denoted by W2' in FIG. 7h, is half the difference between OD2' and ID'. The example of a conic element 251 in FIG. 7g comprises an outside diameter with a circular cross-section that changes at a linear rate, however, it is appreciated that a non-circular cross-section can be used, where the wall thickness is measured as the distance between an inside surface and outside surface at a point on a conic element 251. The wall thickness can be varied by changing various parameters of the conic elements 251, including but not limited to, changing the outside diameter and/or the inside dimensions. For example, the conic elements 251 have a length L' of between and including about 0.2 inches to 2 inches, between and including about 0.5 inches to 1.7 inches, between and including about 1 inch to 1.5 inches, between and including about 1.2 inches to 1.5 inches, between and including about 1.3 inches to 1.4 inches, or about 1.375 inches.

Referring to FIGS. 7g, 7h, 7k, and 7l, the conic elements 251/471 can have an outside diameter OD2' between and including about 0.2 inches to 3.0 inches. For example, the conic elements 471/251 can have an outside diameter OD2' between and including about 0.2 inches to 3.0 inches, between and including about 0.5 inches to 2.5 inches, between and including about 1 inch to 2 inches, between and including about 1.3 inches to 1.7 inches, between and including about 1.4 inches to 1.6 inches, or about 1.5 inches.

The conic elements 251 can also have an inside diameter ID' of, for example, between and including about 0.05 inches to 2.9 inches, between and including about 0.08 inches to 2 inches, between and including about 0.1 inches to 1.5 inches, between and including about 0.2 inches to 1 inch, between and including about 0.3 inches to 0.8 inches, between and including about 0.4 inches to 0.6 inches, between and including about 0.4 inches to 0.6 inches, or an inside diameter ID' of about 0.5 inches.

The inside diameter ID' of the conic element 471/251 is determined based on the outside diameter OD2' of the conic element 251. For example, the inside diameter ID' of the conic element 251 can be between $10^{-4}$ and 1 times, between and including about 0.1 times and 0.9 times, between and including about 0.15 times and 0.75 times, between and including about 0.2 times and 0.6 times, between and including about 0.25 times and 0.4 times, between and including about 0.3 times and 0.36 times, between and including about 0.32 times and 0.34 times, or about 0.33 times the outside diameter OD2' of the conic element 471/251.

The conic element 471/251 can comprise at least three layers of viscoelastic foam. In some embodiments, the first layer of viscoelastic foam begins on the first end 471/271 and comprises a hard firmness foam with a length in the direction between the first end 471/271 to the second end 472/272. This length can be any suitable length, for example between and including 0.5 inches to 0.8 inches or between and including about 0.6 inches to 0.8 inches. Similarly, the second layer of viscoelastic foam can be fixed to the first layer and comprises a medium firmness foam with a length in the direction between the first end 471/271 to the second end 472/272. This length can be any suitable length, for example between and including about 0.2 inches to 0.6 inches. The third layer of viscoelastic foam can be fixed to the second layer and comprise a soft firmness foam with a length in the direction between the first end 471/271 to the second end 472/272. This length can be any suitable length, for example between and including about 0.25 inches to 0.375 inches.

The hard firmness foam can be, for example, in a range of about 1.14 pounds per square inch per square foot ("psi/sq. ft.") to about 1.30 psi/sq. ft or a range of about 1.22 psi/sq. ft. to about 1.32 psi/sq. ft. The medium firmness foam can be, for example, in a range of about 0.85 psi/sq. ft. to about 0.95 psi/sq. ft or a range of about 0.88 psi/sq. ft. to about 0.98 psi/sq. ft. The soft firmness foam can be, for example, in a range of about 0.65 psi/sq. ft. to about 0.73 psi/sq. ft or a range of about 0.68 psi/sq. ft. to about 0.78 psi/sq. ft.

Further, the hard firmness viscoelastic foam can comprise, for example, a thickness of between and including about 0.2 inches to 0.8 inches or a thickness of between and including about 0.4 inches to 0.6 inches, a density of between and including about 0.5 pounds per cubic foot to 5 pounds per cubic foot or a density of between and including about 1.2 pounds per cubic foot to 1.3 pounds per cubic foot, and a pore concentration of between and including 600 pores per cubic inch to 1,100 pores per cubic inch or a pore concentration of between and including 800 pores per cubic inch to 900 pores per cubic inch.

The medium firmness viscoelastic foam can comprise, for example, a thickness of between and including about 0.2 inches to 0.8 inches or a thickness of between and including about 0.4 inches to 0.6 inches, a density of between and including 0.5 pounds per cubic foot to 5 pounds per cubic foot or a density of between and including about 0.9 pounds per cubic foot to 1 pound per cubic foot, and a pore concentration of between and including 860 pores per cubic inch to 1,360 pores per cubic inch, or a pore concentration of between and including 1,060 pores per cubic inch to 1,160 pores per cubic inch.

Further, the soft firmness viscoelastic foam can comprise a thickness of between and including about 0.125 inches to 0.5 inches or a thickness of between and including about 0.35 inches to 0.45 inches, a density of between and including about 0.5 pounds per cubic foot to 5 pounds per cubic foot or a density of between and including about 0.88 pounds per cubic foot to 0.98 pounds per cubic foot, and a pore concentration of between and including 880 pores per cubic inch to 1,380 pores per cubic inch or a pore concentration of between and including about 1,080 pores per cubic inch to 1,180 pores per cubic inch.

The conic elements 251/451 can be coupled with a barrier layer 253/453 that is configured to allow air beyond a certain pressure to pass through or permeate the material. Specifically, the conic element 251 can be configured to allow air beyond a first pressure to pass through or permeate its material and the barrier layer 253 can be configured to allow air beyond a second pressure to pass through or permeate its material, where the first pressure is lower than the second pressure. In some embodiments, the conic element 251 is configured to allow air beyond a first pressure to pass through or permeate its material and the barrier layer 253 is configured to allow air beyond a second pressure to pass through or permeate its material, where the second pressure is between and including about 1 and 100 times the value of the first pressure.

In some embodiments, the outside diameter OD1' of the first end 271/471 can be, for example, between and including about 40% to 100%, between and including 60% to 98%, between and including about 70% to 98%, between and including about 75% to 85%, or about 80% of the outside diameter OD2' of the second end 272/472. Alternatively or additionally, the outside diameter OD' of a conic element 251/451 can be substantially the same and the inside diameter ID' can vary to provide a difference in wall thickness W' between the first end 271 and the second end 272/472.

Changing the outside diameter OD1' of the first end 271 relative to the outside diameter OD2' of the second end 272 can provide a varied amount of contact with adjacent conic elements 251, when installed in a helmet. In some embodiments, the first end 271 is fixed to the core of a helmet and the second end 272 is oriented towards a user's head. The second end 272 can have a barrier layer 253 fixed thereto to provide an air impermeable or a partially air impermeable barrier. When the first end 271 has a smaller diameter than the second end 272 and where the first end 271 is fixed to the core of a helmet, the amount of lateral contact with adjacent conic elements 251 increases towards the second end 272. The amount of lateral contact with adjacent conic elements 251 can be impacted by factors including the curvature of the inside of the helmet core and the difference in diameter between the conic elements between a first end 271 and second end 272.

Further, shock absorption capacity of each conic element 251 can increase in areas where adjacent conic elements 251 are in contact with one another along their outside diameter. When butted against a second conic element 251, air that escapes through the open cell foam of the conic element 251 can collide with air escaping from an adjacent conic element 251, slowing its rate of progression through the open cell foam. In some embodiments, at least about 40%, or at least about 50%, or at least about 60%, or at least about 70%, or at least about 80% of the conic elements can be in contact with at least one adjacent conic element.

The helmet 10 can include both foam cylinders 51 and conic foam elements 251 to provide a better impact absorption profile. The conic elements 251 can be placed at areas of the helmet 10 expected to experience the most intense impacts and the foam cylinders 51 can be placed in areas that are expected to experience less intense impacts.

Figure 7J:
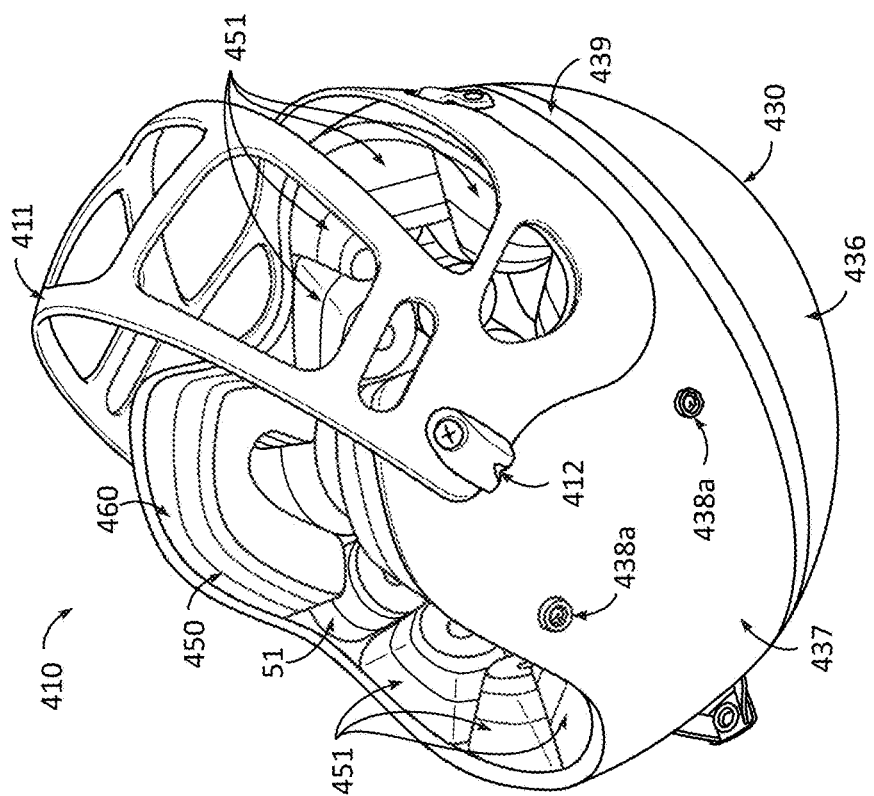
FIG. 7*j* depicts a schematic illustration of a side view of a helmet according to some embodiments disclosed herein.
Figure 7I:
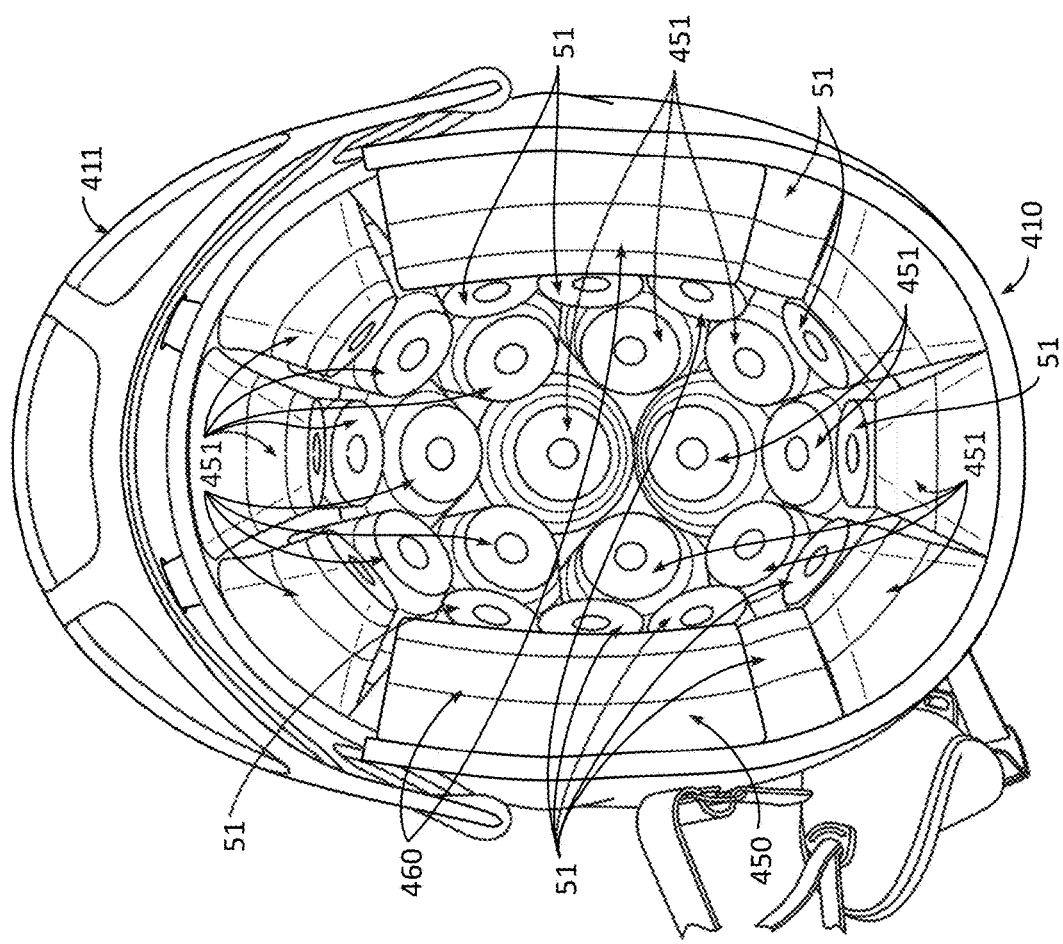
FIG. 7*i* depicts a schematic illustration of a bottom view of a helmet according to some embodiments disclosed herein.

FIGS. 7i-7j depict inside and side views of the helmet 410, with the liner 470 and any barrier layers removed to show the IIAS 450 in detail. As noted previously, the IIAS 450 can include various impact absorbing members, such as cylinders foam impact absorbing members 51, ear strips 460, and/or conic impact absorbing components 451.

The IIAS 450 can comprise conic impact absorbing components 451 in relatively higher impact areas of the helmet 410 and foam cylinders 51 in relatively lower impact areas of the helmet 410. Relatively lower impact areas of the helmet 410 can include the sides of the helmet 410 relative to a user's head. Relatively higher impact areas of the helmet 410 can include the front and rear of the helmet 410 relative to a user's head.

Figure 7L:
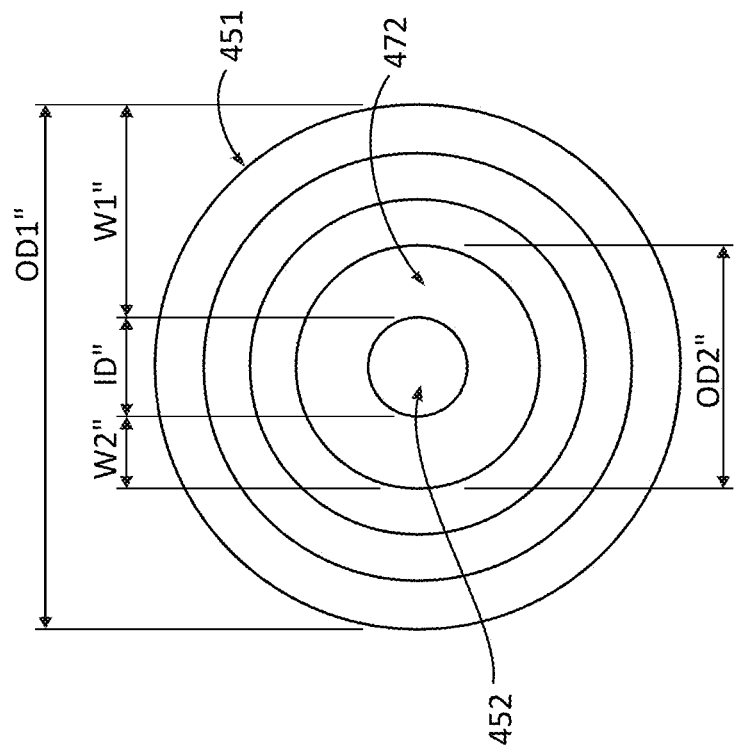
FIG. 7*l* depicts a schematic illustration of a cross-section of an impact absorbing component according to some embodiments disclosed herein.
Figure 7K:
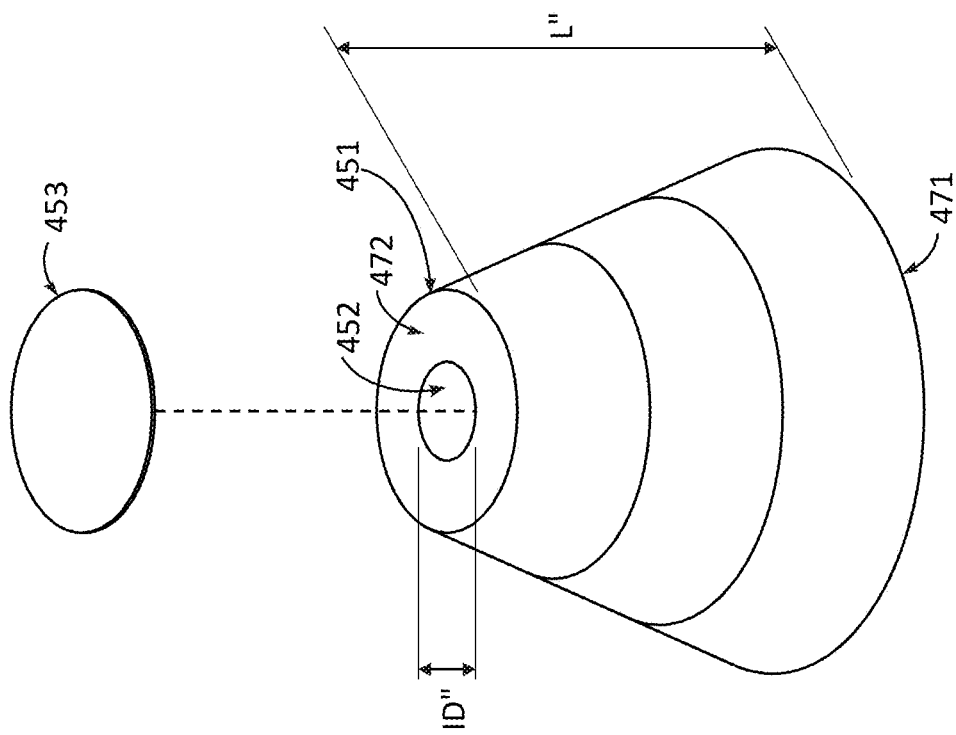
FIG. 7*k* depicts a schematic illustration of an impact absorbing component according to some embodiments disclosed herein.

FIGS. 7k-7i depict an example of a conic element 451 that can be used in the helmet 410 (with a barrier layer 453 removed). As noted previously, the conic elements 451 can have a first end 471 fixed to the core 440A and a second end 472 opposite the first end. The conic elements 451 can have an external diameter that varies by some amount between the first end 471 and the second end 472. For example, the ratio of the external diameters at the first end 471 and the second end 472 can be in a range of about 0.4 to about 0.95. The variance in diameter can be linear but does not necessarily need to be. The conic elements can also include an axial opening 452 oriented along the same axis as the conic element 451. The axial opening 452 can be oriented along the same axis of the conic element 451, but there are situations where it may be preferable to offset the axes. In some embodiments, offsetting the axes can change the compressive properties of the conic elements 451 without having to change their material, diameter, or height.

The axial opening 452 can be configured as one or more through holes that extend from the first end 471 of the conic element 451 to the second end 472. The axial openings 452 can also be configured as countersunk holes, where their depth is less than the height of the conic element 451. The axial openings 452 can also be countersunk from either direction. Further, the conic elements 451 have more than one axial opening 452 to reduce the weight of the conic element 451 and to change its impact absorption properties. Additionally or alternatively, the conic elements 451 can have a centrally located axial opening 452 and a plurality of smaller holes located in the radial direction from the centrally located axial opening 452. The axial opening 452 can be shaped cylindrically, conically or in in the shape of any appropriate hole or void. For example, the axial opening 452 can be configured such that it does not extend to either end of the conic elements 451 and, instead, is an internal void.

The conic elements 451 can have a variance in wall thickness at some point between the first end 471 and the second end 472. The distance between the first end 471 and the second end 472 is denoted by the length L" in FIG. 7k. The outside diameter of the conic element 451 at the first end is denoted by OD1" in FIG. 7k. The outside diameter of the conic element 451 at the second end is denoted by OD2" in FIG. 7l. The inside diameter of the conic element 451 is denoted by ID" in FIGS. 7k, 7i. The wall thickness at the first end 471, denoted by W1" in FIG. 7l, is half the difference between OD1" and ID". The wall thickness at the second end 472, denoted by W2" in FIG. 7l, is half the difference between OD2" and ID". In the example shown in FIG. 7k, the conic element 451 comprises an outside diameter with a circular cross-section that changes at a linear rate, however, it is appreciated that a non-circular cross-section could be used in some embodiments. The wall thickness can be varied by changing various parameters of the conic elements 451, including but not limited to, changing the outside dimension and/or the inside dimensions.

In some embodiments, the conic elements 451 can comprise a length L" of between and including about 0.2 inches to 2 inches. For example, the conic elements 451 can have a length L" of between and including about 0.5 inches to 1.7 inches, between and including about 1 inch to 1.5 inches, between and including about 1.2 inches to 1.5 inches, between and including about 1.3 inches to 1.4 inches, or about 1.375 inches.

The conic elements 451 can have an outside diameter OD1" of, for example, between and including about 0.2 inches to 3.0 inches, about 0.2 inches to 3.0 inches, about 0.5 inches to 2.5 inches, about 1 inch to 2 inches, about 1.3 inches to 1.7 inches, about 1.4 inches to 1.6 inches, or about 1.5 inches.

Further, the conic elements 451 can have an inside diameter ID" between and including about 0.05 inches to 2.9 inches, between and including about 0.08 inches to 2 inches, between and including about 0.1 inches to 1.5 inches, between and including about 0.2 inches to 1 inch, between and including about 0.3 inches to 0.8 inches, between and including about 0.4 inches to 0.6 inches, between and including about 0.4 inches to 0.6 inches, or about 0.5 inches.

In some embodiments, the inside diameter ID" of the conic element 451 is determined based on the outside diameter OD1" of the conic element 451. In some embodiments, the inside diameter ID" of the conic element 251 is between 0 and 1 times the outside diameter OD1" of the conic element 451. In some embodiments, the inside diameter ID" of the conic element 451 is between and including about 0.1 times and 0.9 times the outside diameter OD1" of the conic element 451. In some embodiments, the inside diameter ID" of the conic element 451 is between and including about 0.15 times and 0.75 times the outside diameter OD1" of the conic element 451. In some embodiments, the inside diameter ID" of the conic element 451 is between and including about 0.2 times and 0.6 times the outside diameter OD1" of the conic element 451. In some embodiments, the inside diameter ID" of the conic element 451 is between and including about 0.25 times and 0.4 times the outside diameter OD1" of the conic element 451. In some embodiments, the inside diameter ID" of the conic element 451 is between and including about 0.3 times and 0.36 times the outside diameter OD1" of the conic element 451. In some embodiments, the inside diameter ID" of the conic element 451 is between and including about 0.32 times and 0.34 times the outside diameter OD1" of the conic element 451. In some embodiments, the inside diameter ID" of the conic element 451 is about 0.33 times the outside diameter OD1" of the conic element 451.

Figure 7M:
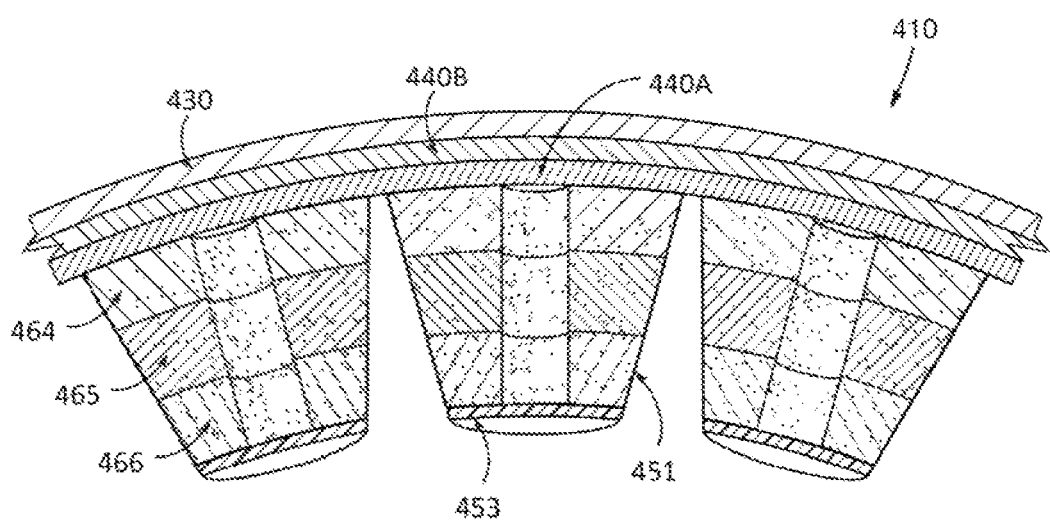
FIG. 7*m* depicts another schematic illustration of a cross-section of an impact absorbing component according to some embodiments disclosed herein.

FIG. 7m depicts a sectioned view of a portion of the helmet 410, sectioned through the EIAS 430, the core 440A, 440B, a series of conic elements 451, and the barrier layers 453. The view in FIG. 7m is not necessarily to scale and is provided to show the positional relationship between the layers of materials. In this example, a single layer EIAS 430 is fixed to the outside of a core 440A, 440B. The core comprises two or more layers, for example an external carbon fiber layer 440B and an internal Kevlar® layer 440A. Further, the conic elements 451 can be configured such that a first wider end is fixed to the Kevlar® layer 440A and the conic element tapers towards the user's head. On the end of the conic element 451, opposite the end fixed to the Kevlar® layer 440A, a barrier layer 453 is fixed to the conic element 451. In some embodiments, instead of using a single large ear hole on each side of the helmet 410, there are a plurality of small diameter openings in the core layer 440A & 440B in the vicinity of a wearer's ear that allow some sound to pass through the helmet 410. Small diameter openings, when used referring to ear holes herein, mean holes sized with a suitable diameter of for example between and including 0.05 inches to 0.5 inches.

Figure 7O:
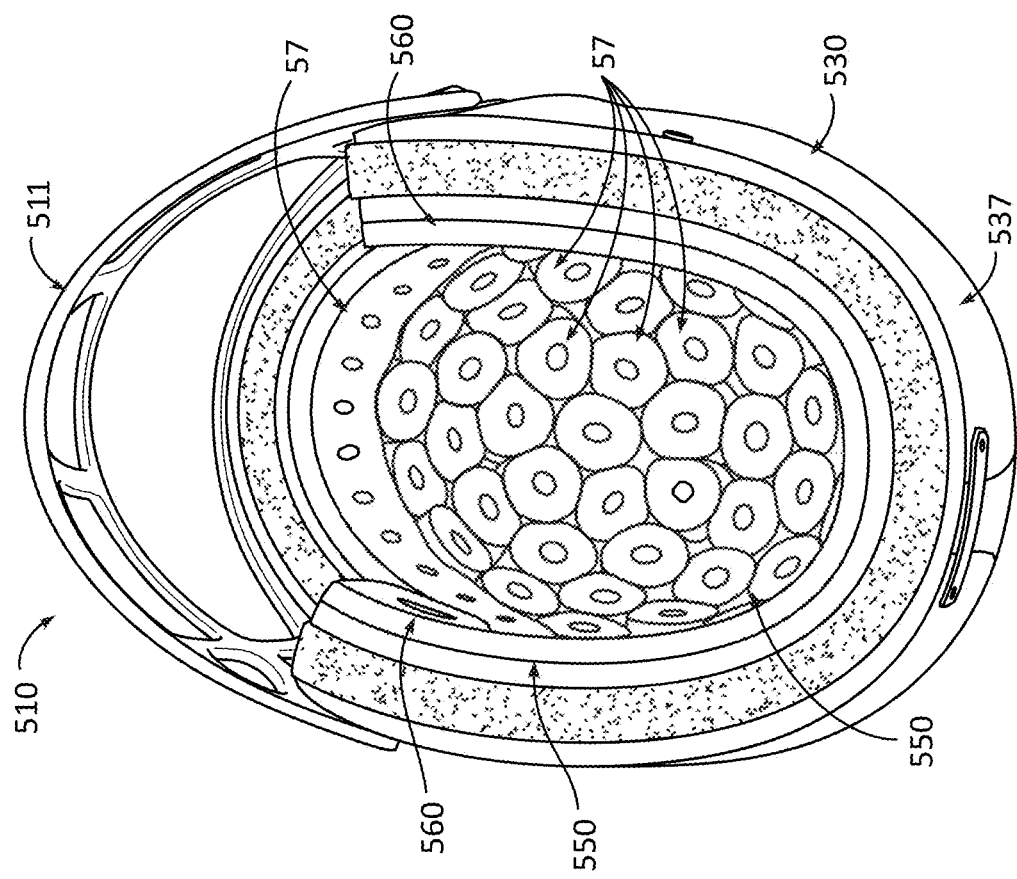
FIG. 7*o* depicts another schematic illustration of a bottom view of a helmet according to some embodiments disclosed herein.
Figure 7N:
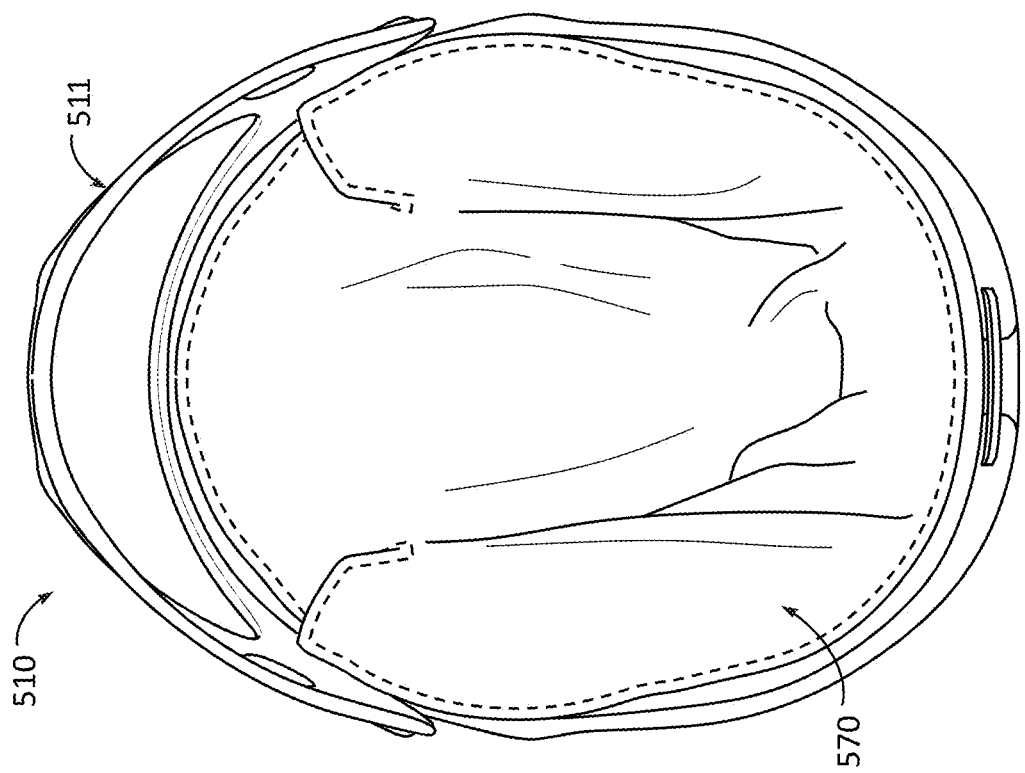
FIG. 7*n* depicts a schematic illustration of a bottom view of a helmet according to some embodiments disclosed herein.
Figure 7Q:
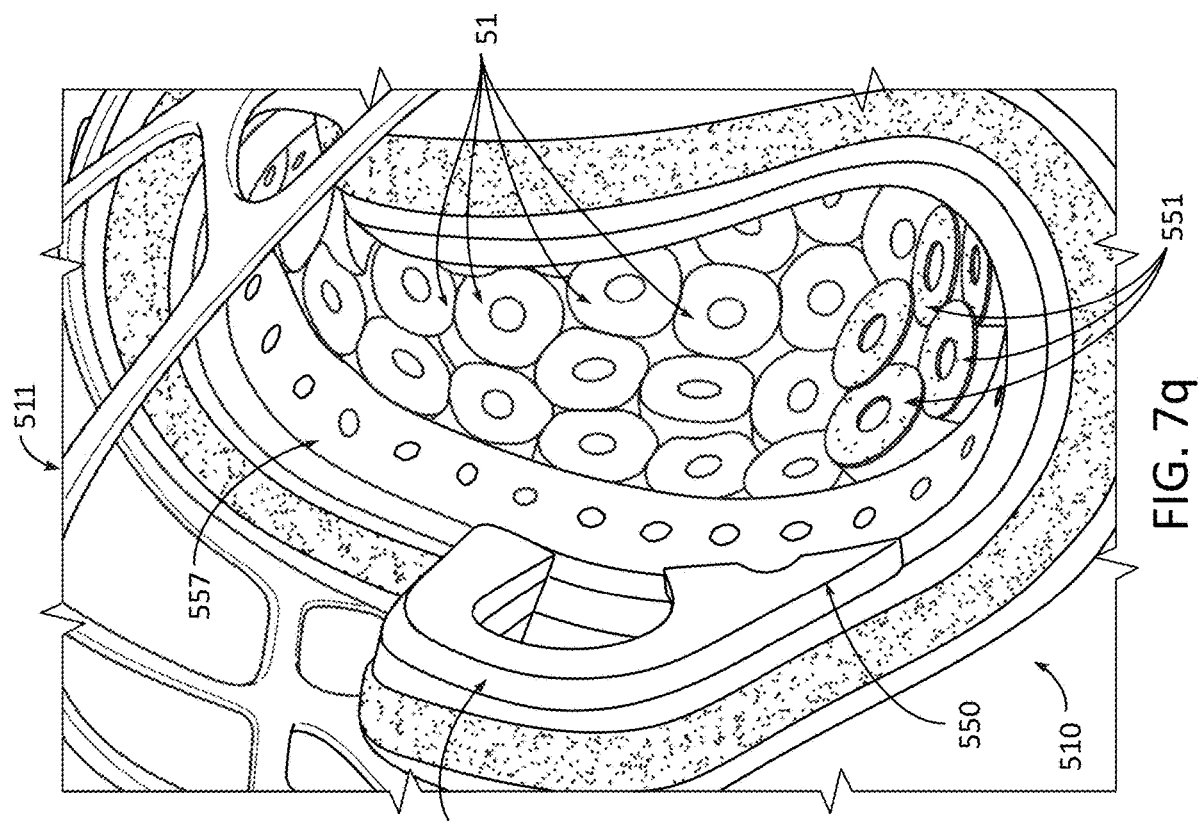
FIG. 7*q* depicts another schematic illustration of an interior portion of a helmet according to some embodiments disclosed herein.
Figure 7P:
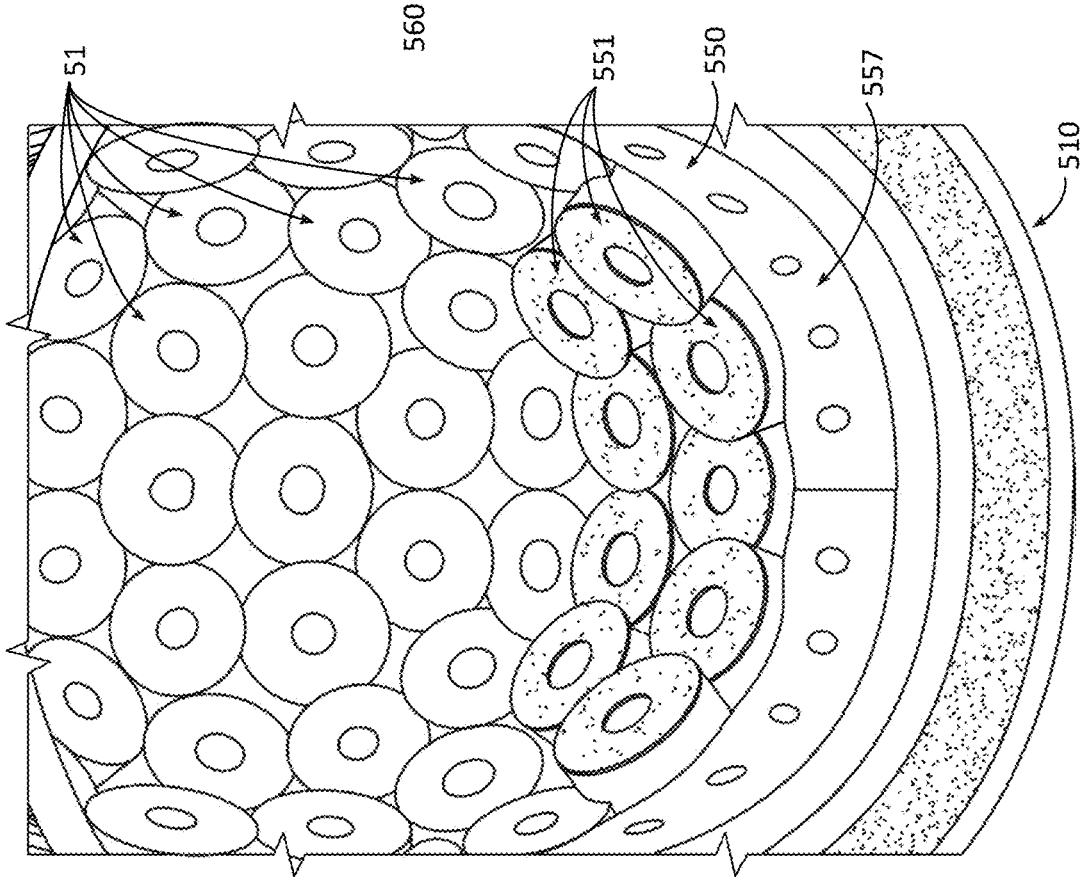
FIG. 7*p* depicts a schematic illustration of an interior portion of a helmet according to some embodiments disclosed herein.

FIG. 7n-7o depict an example of a football helmet 510 according to some embodiments disclosed herein. FIG. 7n depicts a bottom view of the helmet 410 with a liner 570 installed and a facemask 511 attached. FIGS. 7o-7q illustrate bottom and detail views of the helmet 510 with the liner 570 removed and any barrier layer removed. As noted previously, the barrier layer can be beneficial to enhance the impact absorption properties of the IIAS 550.

Further, as noted, the IIAS 550 of the helmet 510 comprises impact absorbing components (e.g., foam cylinders, modified foam cylinders, or foam cones) 51, ear strips 560, and elongate strips 557. The ear strips 560 protect the area below a wearer's ears from impact. The elongate strips 560 can form a circumferential band about the base of the helmet and provide a consistent level of impact absorption along the base area of the helmet 510. The impact absorbing components (shaped as foam cylinders in this example) 51 line the majority of the interior of the helmet 510 above the elongate strips 557 and can provide most of the impact absorption from impacts to the front, top, and sides of the head. The impact absorbing components (shaped as modified foam cylinders in this example) 551 line an area on the rear of the helmet 510 above the elongate strip 557 and can provide most of the impact absorption from impacts to the rear of the head.

The modified foam cylinder shaped impact absorbing components 551 can be configured for additional impact absorption capacity over the foam cylinder shaped impact absorbing components 51 that are fixed at other locations within the helmet 510. The modified foam cylinders 551 can be constructed in a similar manner as the foam cylinders 51. For example, the modified foam cylinders 551 can comprise the same number and type of layers as the foam cylinders 51 in the helmet 510. Additionally or alternatively, the modified foam cylinders 551 comprise a length in a direction away from a core layer that is about 105% or about 100% to 115% the length of the foam cylinders 51. Further, the modified foam cylinders 551 can comprise multiple layers in the same proportions as the foam cylinders 51. Additionally or alternatively, some or all modified foam cylinders 551 can comprise multiple layers that are not in the same proportions as the foam cylinders 51.

Figure 7R:
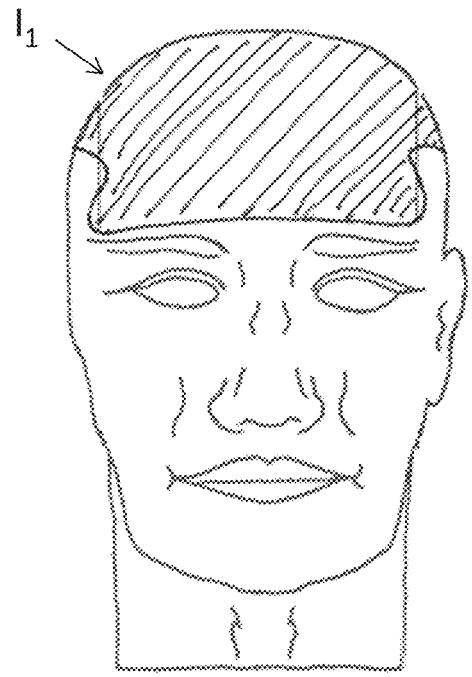
FIG. 7*r* depicts a region on a head of a wearer that can be protected against impact using one or more cone-shaped impact absorption elements according to the embodiments disclosed herein.
Figure 7S:
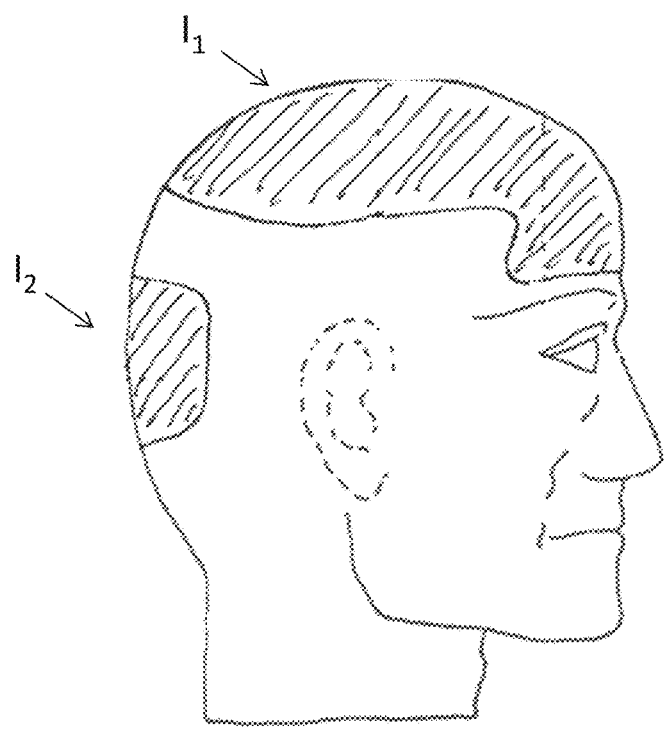
FIG. 7*s* depicts other regions on a head of a wearer that can be protected against impact using one or more cone-shaped impact absorption elements according to the embodiments disclosed herein.

The conic foam impact-absorption elements and the foam cylinders can be distributed throughout the inner surface of a helmet such that they appropriately absorb impact incident on various areas of the wearer's head. For example, as shown in FIGS. 7r-7s, conic impact-absorption elements can be distributed so as to be in substantial registration with the top, front, front sides, sides, and back of a wearer's head (regions $I_1$ and $I_2$) when the helmet is worn by a wearer.

Figure 8A:
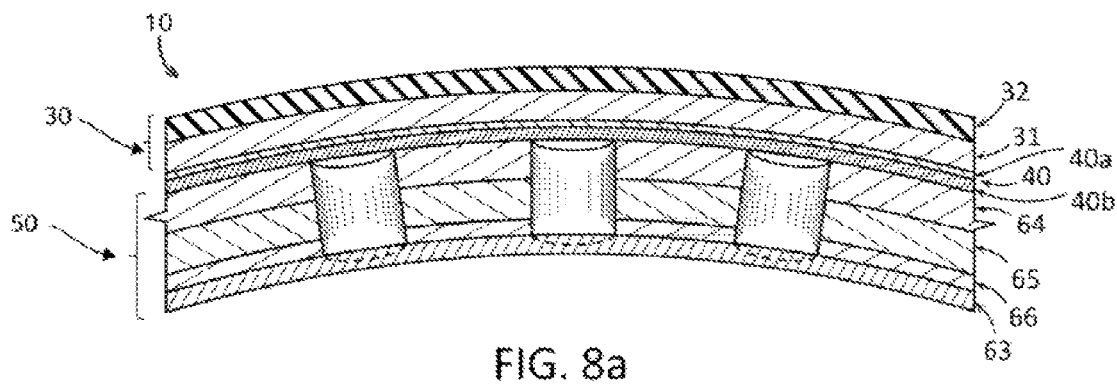
FIG. 8*a* depicts a side view of a section of a protective headgear according to some embodiments disclosed herein.
Figure 8B:
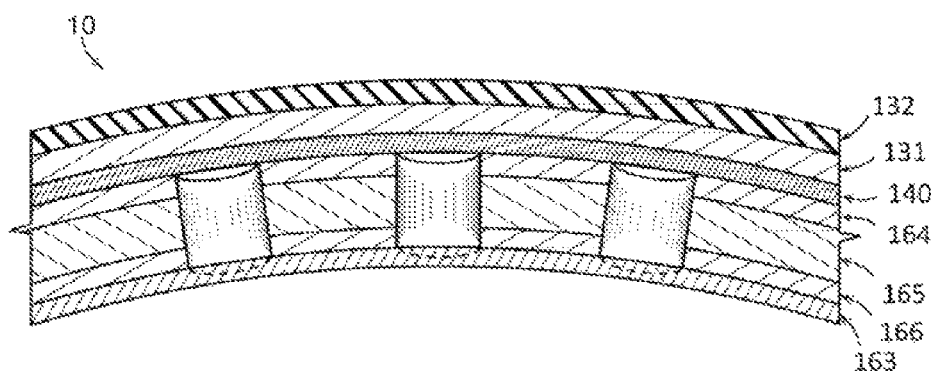
FIG. 8*b* depicts a side view of a section of a protective headgear according to some embodiments disclosed herein.

FIGS. 8a-8b depict side views of a section of the helmet 10, illustrating the various layers of the helmet 10. As shown, the helmet 10 includes an EIAS layer 30, a core layer 40, and an IIAS layer 50. Each of these layers can comprise any suitable number of layers and each layer can comprise any suitable thickness. For example, in the embodiment shown in FIG. 8a, the EIAS layer 30 comprises two layers 31, 32, the core layer 40 comprises two layers 40a, 40b, and the IIAS layer 50 comprises three layers 64, 65, 66, and is sealed on its proximal end to the inside of the core layer 40 and sealed on its distal end by a barrier layer 63. However, in the example shown in FIG. 8*b*, the IIAS 50 of the helmet 100 comprises three layers 164, 165, 166. The IIAS comprises three layers 164, 165, 166, and is sealed on its proximal end to the inside of the core 140 and sealed on its distal end by a barrier layer 163.

As noted, IIAS 50, the core 40, the EIAS 30 can generally comprise any suitable material and/or any suitable number of layers. Further, adjacent layers of the IIAS 50, the core 40, the EIAS 30 can have identical, similar, or different compositions and/or properties. For example, each of these layers can include one or more layers of a suitable foam.

Further, the IIAS 50 can comprise one or more layers of a viscoelastic material, having both a viscous component as well as an elastic component, along with a time-dependent strain rate, such as a viscoelastic polyurethane foam, a low-resilience polyurethane foam, a memory foam, or a temper foam. The viscoelastic material can be configured to be pressure and temperature sensitive, and also to be capable of molding to the contour of any object that may be pressed against the viscoelastic material. This can allow the viscoelastic layer to contour to the head of a wearer, thereby eliminating gaps between the IIAS 50 and a wearer's head without requiring customization for each individual wearer.

The viscoelastic material can also provide effective impact cushioning and temperature control. For example, the viscoelastic material can be incorporated into the IIAS 50 in order to absorb impact and provide impact absorption between a wearer's head and the core 40. Further, the viscoelastic layer can be configured to stabilize the temperature of objects placed against this layer, by slowly absorbing and releasing heat, thereby stabilizing the temperature of a wearer's skin and/or head.

Similarly, the IIAS 50 can comprise one or more layers of any suitable foam. For example, the IIAS can comprise a soft to medium lightweight viscoelastic layer of foam 64 as well as a layer of firm lightweight viscoelastic foam 65. The terms soft, medium, and firm, as used herein for foam, refer to the relative difficulty in compressing an area of foam, and are otherwise known as the firmness of the foam. A lightweight viscoelastic foam can generally be capable of absorbing the energy of sudden impacts. An example of a material that can be particularly well suited for this purpose is an elastomeric polyurethane viscoelastic open cell foam with a density between and including one quarter and 15 pounds per cubic foot. In some embodiments, the first layer 64 can comprise a medium-soft lightweight viscoelastic foam with a density between and including one half to one pound per cubic foot and the second layer 65 can comprise a firm lightweight viscoelastic foam with a density between and including one to one and a half pounds per cubic foot.

The IIAS 50 can also include a gel-like foam, for example a viscoelastic foam having gel-like properties, an open cell structure, and a soft dough-like consistency. The gel-like foam can be configured such that it is capable of easily molding around a wearer's head to eliminate any gaps. Further, the gel-like foam can have any suitable density, for example a density between and including 15 and 50 pounds per cubic foot, and be configured such that it is particularly effective at providing effective impact cushioning while maintaining its shape when worn by a user. For example, in some embodiments, a gel-like foam with a density between and including 15 and 33 pounds per cubic foot can be used to provide effective impact cushioning in the helmet. Alternatively or additionally, a gel-like foam having a density between 30 and 35 pounds per cubic foot can be in the IIAS 50 (e.g., in the first layer 64).

As noted, the various layers of the IIAS 50, the core 40, and EIAS 30 can have any suitable thickness and/or density. For example, in some embodiments, the first layer 64 and second layer 65 can comprise a substantially similar thickness, and the thickness of the third layer 66 can be between and including 50-70% of the thickness of either the first 64 or the second layer 65. As used herein, the term "substantially similar thickness" is intended to describe layers having a thickness of up to and including at most 10% variation from one another. Further, while the use of viscoelastic foam has been disclosed as a suitable material, it is appreciated that other materials with similar impact absorbing and density properties can also be suitable.

For example, in some embodiments, at least one layer of the IIAS 50 (e.g., first layer 64) can comprise at least one of: a medium lightweight viscoelastic foam having a thickness between and including about 0.3 to 0.75 inches, a medium lightweight viscoelastic foam having a thickness between and including about 0.4 to 0.6 inches, a medium lightweight viscoelastic foam having a thickness between and including about 0.45 inches to 0.55 inches, a firm lightweight viscoelastic foam with a thickness between and including about 0.4 inches to 1.0 inch and a density between and including about 0.5 pounds per cubic foot to one pound per cubic foot, a gel-like foam with a thickness between and including about 0.2 to 0.5 inches and a density between and including about 15 pounds per cubic foot to 50 pounds per cubic foot, a firm lightweight viscoelastic foam with a thickness between and including about 0.7 inches to about 0.8 inches, and a firm lightweight viscoelastic foam with a thickness between and including about 0.6 inches to 0.9 inches and a density between and including about 0.5 pounds per cubic foot to one pound per cubic foot.

Alternatively or additionally, at least one layer of the IIAS 50 (e.g., the second layer 65) can comprise a medium soft lightweight viscoelastic foam having a thickness between and including about 0.30 to 0.75 inches, a medium soft lightweight viscoelastic foam having a thickness between and including about 0.4 to 0.6 inches, a medium soft lightweight viscoelastic foam having a thickness between and including about 0.45 to 0.55 inches, a medium lightweight viscoelastic foam with a thickness between and including about 0.3 to 0.75 inches and a density between and including about one pound per cubic foot to 1.5 pounds per cubic foot, a gel-like foam with a thickness between and including about 0.2 to 0.5 inches and a density between and including about 15 pounds per cubic foot to 50 pounds per cubic foot, a medium lightweight viscoelastic foam with a thickness between and including about 0.45 to 0.55 inches and a density between and including about 0.25 pounds per cubic foot to 15 pounds per cubic foot, and a medium lightweight viscoelastic foam with a thickness between and including about 0.4 to 0.6 inches and a density between and including about one pound per cubic foot to 1.5 pounds per cubic foot.

Alternatively or additionally, at least one layer of the IIAS 50 (e.g., the third layer 66) can comprise a gel-like foam having a thickness between and including about 0.20 to 0.50 inches and a density between and including about 15 pounds per cubic foot to 50 pounds per cubic foot, a gel-like foam having a thickness between and including about 0.25 to 0.35 inches and a density between and including about 15 pounds per cubic foot to 50 pounds per cubic foot, a gel-like foam having a thickness between and including about 0.25 to 0.32 inches and a density between and including about 15 pounds per cubic foot to 50 pounds per cubic foot, a gel-like foam with a thickness between and including about 0.2 to 0.5 inches and a density between and including about 15 pounds per cubic foot to 50 pounds per cubic foot, a gel-like foam with a thickness between and including about 0.25 to 0.35 inches and a density between and including about 15 pounds per cubic foot to 50 pounds per cubic foot, and a gel-like foam with a thickness between and including about 0.25 to 0.32 inches and a density between and including about 15 pounds per cubic foot to 50 pounds per cubic foot.

Similarly, in some embodiments, at least one layer of the EIAS 30 (e.g., layer 31) can comprise at least one of: a lightweight viscoelastic foam fixed to the exterior of the core 40 to absorb the impact energy from sudden impacts on the exterior of the helmet 10, an elastomeric, polyurethane viscoelastic open cell foam with a density between and including one half and 15 pounds per cubic foot, an elastomeric, polyurethane viscoelastic open cell foam with a density between and including one half and eight pounds per cubic foot, an elastomeric, polyurethane viscoelastic open cell foam with a density between and including one and two pounds per cubic foot, an elastomeric, polyurethane viscoelastic open cell foam with a density between and including one and one and a half pounds per cubic foot. While a viscoelastic foam can be an appropriate material for the layers of the EIAS 30, other materials capable of absorbing high impact energy can also be suitable.

Alternatively or additionally, at least one layer of the EIAS 30 can comprise a water-resistant layer (e.g., layer 32 can be water resistant and fixed to the top of the layer 31). Generally any suitable waterproof layers or coatings, such as a rubberized coating or room temperature vulcanization silicone, can be used. Alternatively and additionally, the water resistant layer can be a two-part, a flexible polyurethane adhesive that has been configured to be hard enough to resist scuffing and tearing, but also soft enough to remain flexible. For example, materials with a Shore hardness of between and including about A30 to about A90, e.g., in a range of about A40 to about A80, or in a range of about A50 to about A70, can be appropriate for use in a water-resistant layer.

The water-resistant layer can comprise a two-part, flexible polyurethane adhesive with a Shore hardness between and including A40 and A70, for example approximately A50. In some embodiments, the layer 31 is between and including three to six times as thick as the water-resistant layer 32. In some embodiments, an adjacent layer 31 to the water resistant layer can be between and including four to five times as thick as the water-resistant layer 32. For example, the water-resistant layer 32 can be approximately 1.0 mm thick.

Further, to increase the abrasion resistance of the EIAS 30 layer, the outer surface of this layer can optionally be wrapped with a flexible abrasion resistant material, such as a fiber reinforced cloth. Generally any suitable reinforced material can be used (e.g., Exotex® Dacron cloth). Additionally or alternatively, the EIAS 30 can comprise a material such as a single layer of an ethylene-vinyl acetate-based material (EVA). Ethylene-vinyl acetate-based materials can be a particularly effective material for the EIAS 30 because they can provide impact absorption and abrasion resistance. EVA is a copolymer of ethylene and vinyl-acetate, with a chemical formula of $(C_2H_4)_n(C_4H_6O_2)_m$. The ratio of ethylene $((C_2H_4)_n)$ to vinyl-acetate $((C_4H_6O_2)_m)$ used in a particular blend of EVA can impact the overall properties of the EVA material. In some embodiments, the EVA used in the EIAS 30 can comprises a blend of ethylene, vinyl-acetate and nitrogen (N) infused into the material during the forming or molding process. The injection of nitrogen during the forming or molding process can generally decrease the hardness of the resultant EVA material. The EVA can be applied in sheet form at any suitable thickness, for example at thicknesses of between and including 0.1 inches to 0.8 inches or thickness of between and including 0.2 inches to 0.3 inches.

The EIAS 30 can comprise multiple layers of EVA and/or comprise one or more layers of EVA with non-homogeneous properties. Alternatively or additionally, the EIAS 30 can comprise multiple segments of EVA, fixed to the exterior of the core 40, and each having different properties from an adjacent segment of EVA. The segments of EVA with different properties can be butted against one another with a substantially 90-degree edge or butted against each other with a mitered joint. The use of a mitered joint between segments of EVA with different properties can blend the properties of the multiple segments of EVA across the lateral width of the mitered joint. For example, two or more segments of EVA in the EIAS 30 can be butted against each other with a mitered joint of between and including 10 to 80 degrees. Additionally or alternatively, two or more segments of EVA in the EIAS 30 can be butted against each other with a mitered joint of between and including 25 to 65 degrees. For example, two or more segments of EVA in the EIAS 30 can be butted against each other with a mitered joint of between and including 35 to 55 degrees. Additionally or alternatively, two or more segments of EVA in the EIAS 30 are butted against each other with a mitered joint of about 35 degrees. The joint between two segments of EVA can be left uncovered or covered with another layer of material to protect the joint. For example, the joint between two segments of EVA can be protected by a covering 439 (shown in FIGS. 18-21) comprising a thin flexible polymer or plastic material fixed to the exterior surface of the first type of EVA 436 (shown in FIGS. 18-21) and second type of EVA 437 (shown in FIGS. 18-21) adjacent to the joint.

Further, the EIAS 30 can comprise at least a first type of EVA 436 and a second type of EVA 437, where the first type of EVA is fixed towards the front, top, and rear of the helmet 10 and the second type of EVA is fixed towards the sides of the helmet 10. In some embodiments, at least one type of EVA can comprise a hardness of between and including about 10 Shore A and about 60 Shore A and a thickness of between and including about 0.1 inches and about 0.4 inches. For example, the first type of EVA can comprise a hardness of between and including about 15 Shore A and about 18 Shore A and a thickness of between and including about 0.2 inches and about 0.3 inches, a hardness of between and including about 35 Shore A and about 45 Shore A and a thickness of between and including about 0.2 inches and about 0.3 inches. Other types of EVA with different hardness and thickness levels can also be used. For example, at least one other type of EVA can comprise a hardness of between and including 7 Shore A and 25 Shore A and a thickness of between and including 0.1 inches and 0.4 inches, a hardness of between and including 11 Shore A and 14 Shore A and a thickness of between and including 0.1 inches and 0.4 inches, or a hardness of between and including about 30 Shore A to about 40 Shore A and a thickness of between and including about 0.1 inches and about 0.4 inches.

In some embodiments, the core 40 can comprise carbon fiber. The core 40 can be configured to be comparatively thick, such that it is capable of sustaining repetitive impacts normal to the direction of the carbon fiber filaments. Additionally or alternatively, the core 40 can be a fiber reinforced polymer comprising carbon fibers, aramid fibers and a resin. For example, referring to FIG. 8a, the core 40 can comprise a layer of carbon fiber reinforced polymer 40a on the exterior and a layer of Kevlar® reinforced polymer (hereinafter "Kevlar®") 40b on the interior of the core 40, where the layer of Kevlar® 40b can be about three times the thickness of the layer of carbon fiber 40a. This thickness ratio of Kevlar® 40b to carbon fiber 40a can provide, in some aspects, a balance between strength, weight and durability against impact. For example, the layer of Kevlar® 40b on the interior of the core 40 can be about two times the thickness of the layer of carbon fiber 40a on the exterior of the core 40.

The Kevlar® layer 40b can provide additional strength to the carbon fiber 40a and can be generally more flexible to impacts normal to the direction of the Kevlar® fibers, making the core 40 more resistant to cracking. For example, the core 40 comprises a Kevlar® layer 40b and carbon fiber layer 40a, where the Kevlar® layer 40b is between and including one to five times the thickness of the carbon fiber layer 40a. In some embodiments, the thickness of the carbon fiber layer 40a can be, for example, in a range of about 0.1 mm to about 0.3 mm and the thickness of the Kevlar® layer 40b can be, for example, in a range of about 0.3 mm to about 1.2 mm. For example, the core 40 can comprise a Kevlar® layer 40b and a carbon fiber layer 40a, where the Kevlar® layer is about 0.6 mm thick and the carbon fiber layer is about 0.2 mm thick. In some embodiments, the carbon fiber layer 40a can form the interior of the core 40 and the Kevlar® layer 40b can form the exterior of the core 40.

The core 40, the carbon fiber layer 40a, and/or the Kevlar® layer 40b can have a hardness on the Shore D scale. For example, the carbon fiber layer 40a can have a hardness of about 32 Shore D to about 72 Shore D or a hardness of about 47 Shore D to about 57 Shore D. Additionally or alternatively, the Kevlar® layer 40b can have a hardness of about 28 Shore D to about 68 Shore D or a hardness of about 43 Shore D to about 53 Shore D.

As noted above, the core 40 can be modified with a rubberizing compound to increase the flexibility of the core 40 to impacts that are normal to the axial direction of the carbon fiber filaments. For example, the resin used to bond the carbon fiber filaments and the Kevlar® fibers of the core 40 can comprise between and including 30-50% epoxy laminating resin and between and including 50-70% rubberizing compound by weight, about 40% epoxy laminating resin and about 60% rubberizing compound by weight, or about 35% epoxy laminating resin and about 65% rubberizing compound by weight. In some embodiments, the aforementioned ratios between epoxy laminating resin and rubberizing compound are by volume. Additionally or alternatively, the resin used to bond the carbon fiber filaments and Kevlar® fibers of the core 40 can have a hardness of approximately 6.50 on a 0 to 10 scale.

Further, the carbon fiber and Kevlar® fibers are oriented to maximize the resistance of the core 40 to frontal and rear impacts. For example, the carbon fiber and Kevlar® cloth can be oriented so that the fibers towards the front and rear of the helmet are positioned horizontally and vertically in a woven pattern. The core 40 can also include other materials, such as an Exotex® Dacron, having a high strength to weight ratio that exceeds that of carbon fiber and would also be an ideal material for the core 40 when combined with a plastic or laminating resin, a basalt fiber based composite material having high strength and low weight characteristics, or any other material capable of providing structural integrity to the helmet 10, while having suitable weight, crush resistance, and cost.

In the example shown in FIG. 8b, the IIAS comprises three layers of foam, each with different properties, fixed on one end to the inside of the core 140 and sealed on its distal end by the barrier layer 163. The first layer 164 can be fixed to the inside of the core 140 and comprise a soft to medium firmness lightweight viscoelastic foam, having a density of between and including one half to one pound per cubic foot. The second layer 165 can be a layer of firm hardness lightweight viscoelastic foam, which is fixed to the bottom of the soft to medium firmness foam, having a density of between and including one to one and a half pounds per cubic foot. Alternatively or additionally, the first layer 164 comprises a lightweight viscoelastic foam with a density of between and including one quarter to six pounds per cubic foot and the second layer 165 comprises a lightweight viscoelastic foam with a density between and including one half to six pounds per cubic foot. The third layer 166 can comprise a gel-like foam with a density between and including about 30 and 35 pounds per cubic foot or a density between and including about 15 and 50 pounds per cubic foot.

The first layer 164 and third layer 166 can have substantially the same thickness and the second layer 165 can be between and including about 125-175% of the thickness of either the first or third layer 164 & 166. For example, the first layer 164 can be approximately a half inch thick, the second layer 165 can be approximately three quarters of an inch thick, and the third layer can be approximately a half inch thick. Additionally or alternatively, the first layer 164 can be about 1.5 times the thickness of the second layer 165 and the third layer can be about 0.6 times the thickness of the second layer 165. Further, the first layer 164 can have about the same thickness as the second layer 165 and the thickness of the third layer can be about 0.6 times the thickness of the second layer 165.

The EIAS can comprise a layer 131 of lightweight viscoelastic foam that is fixed to the exterior of the core 140 and configured to absorb the impact energy from sudden impacts on the exterior of the helmet 100. For example, the layer 131 can comprise an elastomeric, polyurethane viscoelastic open cell foam with a density between and including about one half and 15 pounds per cubic foot, an elastomeric, polyurethane viscoelastic open cell foam having a density between and including about one half and eight pounds per cubic foot, a density between and including about one and two pounds per cubic foot, or a density between and including about one and one and a half pounds per cubic foot.

Other materials capable of absorbing high impact energy can also be suitable for use in helmet layers. For example, the EIAS can comprise a water-resistant layer 132 fixed to the top of the layer 131, one or more layers of EVA, and/or any other suitable material.

FIGS. 9-11a are exploded perspective views of the inside of the helmet with components of the IIAS 50 removed for clarity.

As noted previously, impact absorbing members 51 can be used to protect the wearer's head, for example the top of a wearer's head, to balance the weight of the IIAS 50 and its impact absorption qualities. The impact absorbing members 51 can include an air void volume (e.g., contained in the cylindrical holes 52) to their volume (e.g., foam volume and exterior volume of foam including the air void volume) ratio that optimizes the impact absorption and weight of the IIAS 50. For example, the air void volume can be about 6% to about 80%, about 6% to about 30%, about 8% to about 18%, or about 10% to about 12% of the overall volume (e.g., foam volume) of an impact absorbing member 51.

Further, since the top of a helmet can experience high impact hits as well as many lower energy hits, the top of the helmet can be configured to be soft enough to protect a wearer from lower energy subconcussive impacts, while remaining capable of protecting a wearer from high energy impacts. The IIAS 50 and the impact absorbing members 51 can be configured to deflect when subject to subconcussive impacts and absorb high energy impacts without bottoming out. Bottoming out in this application is intended to refer to situations when a material has been compressed to its minimum height. Bottoming out is undesirable in a helmet because once the impact absorbing material bottoms out, it cannot provide any substantial impact absorption.

Cylindrical-shaped foam impact absorbing members 51 can be effective at providing absorption of subconcussive and high energy impacts because of the air void located at their centers. An open cell foam can be readily compressed, however air in a sealed space is much more difficult to compress. The air in the center of the foam cylinders 51 is not completely sealed, in that it can escape through the open cell structure of the foam, but when subject to a high energy impact, the air can momentarily act similarly to air trapped in a sealed container to absorb the high energy impact. As the foam cylinder compresses, the air is pushed through the open cell structure of the foam, absorbing the remainder of the impact. The use of air in a void at the center of the foam cylinders 51 can allow the use of a softer foam than would otherwise be appropriate because it reduces the risk of bottoming out in high energy impacts.

The impact absorbing members included in the forehead pad 54, elongate pieces 57 and ear pieces 60 can be configured to use a smaller air void to foam ratio because they are subject to more high energy impacts than the top of the helmet. The use of smaller air voids can provide a level of protection from bottoming out, while also providing shock absorption from the foam itself. In some embodiments, the smaller air void to foam ratio can be in a range of about 1:1.5 to about 1:10.

Figure 11A:
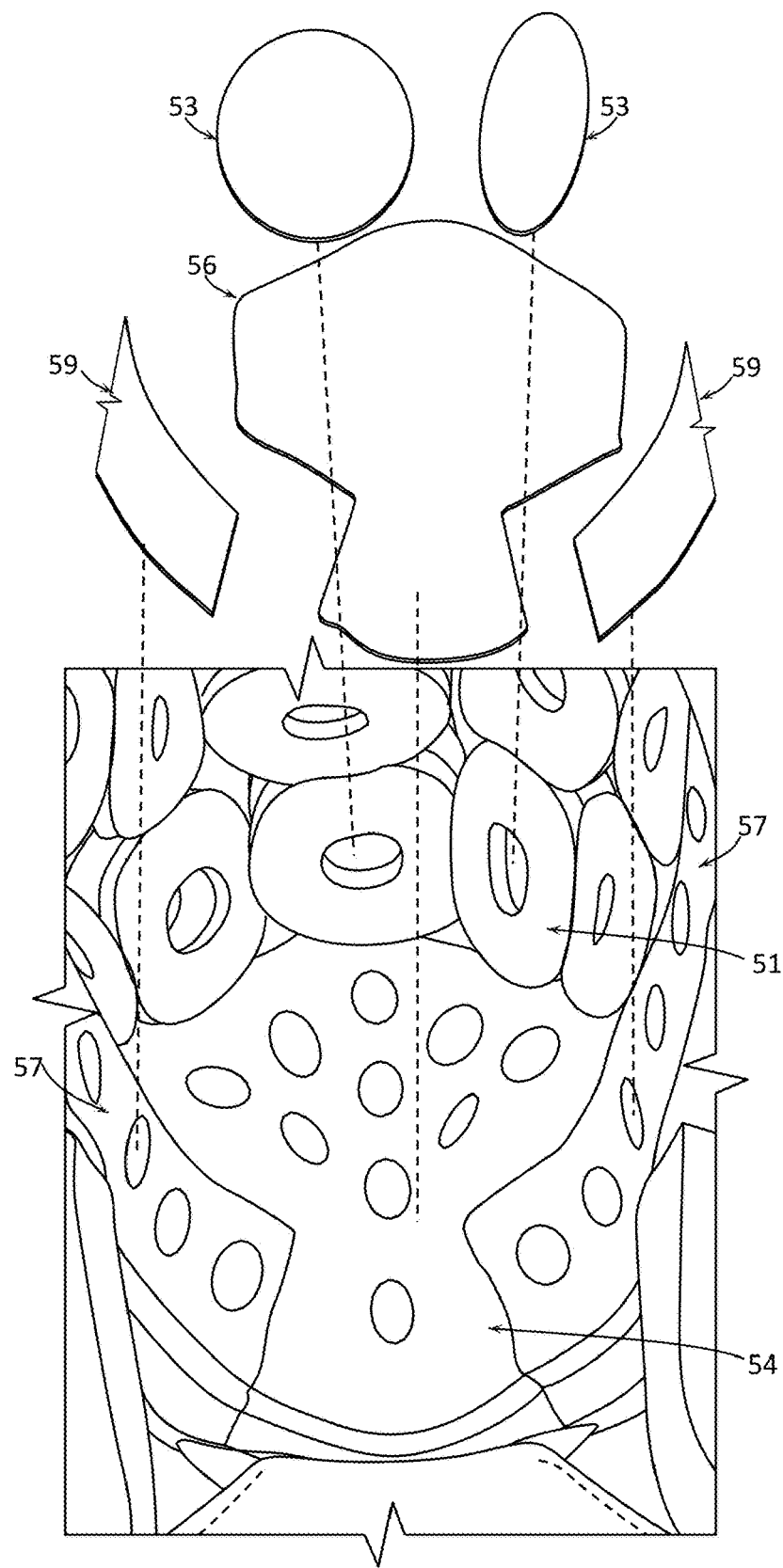
FIG. 11*a* depicts an inside view of a section of a protective headgear according to some embodiments disclosed herein.
Figure 11B:
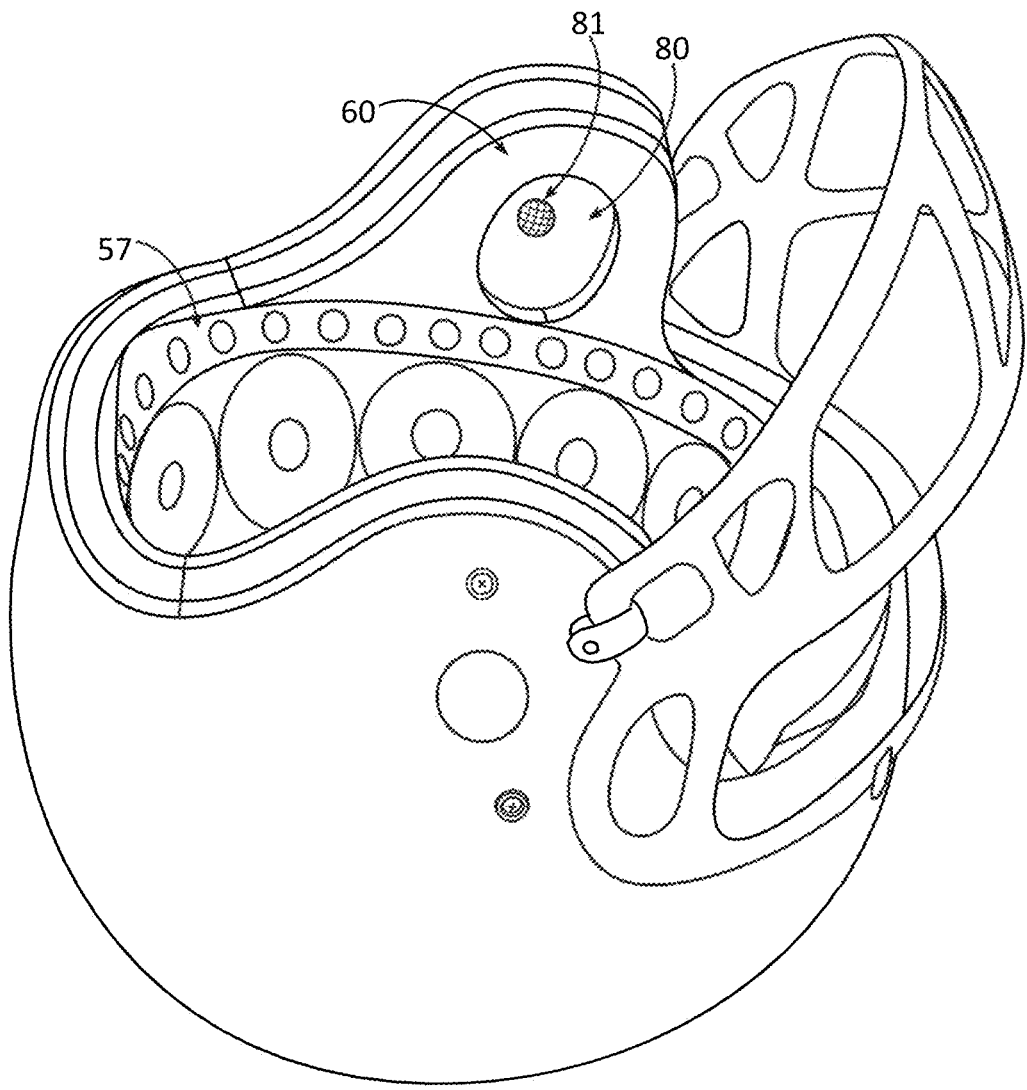
FIG. 11*b* depicts an inside view of a protective headgear according to some embodiments disclosed herein.

Referring to FIG. 11*b*, the helmet can include an acoustic foam and one or more speakers (audio inlet components) mounted near a wearer's ears. For example, the area between the elongate pieces 57 and the ear pieces 60 can include an acoustic foam 80 configured to reduce or eliminate certain sound frequencies. Alternatively or additionally, the area near and between the elongate pieces 57 and the ear pieces 60 can include one or more speakers 81 for transmitting audio to a user. It can be beneficial to reduce or eliminate certain sound frequencies in helmets to provide additional comfort to users and to make it easier to hear audio transmitted by a speaker 81. The speaker can be any suitable speaker known in the art. Alternatively or additionally, the helmet can be coupled with an audio outlet component (e.g., microphone) 399 (shown later in FIG. 12) that is configured to allow the wearer to communicate with others (e.g., via a wireless connection). Any suitable audio outlet or communication technique can be used. Further, the microphone can be disposed within any suitable area of the helmet, for example, near the mouth of the wearer.

The acoustic foam 80 can be an acoustic foam configured to absorb or block sounds, for example sounds up to 4000 Hz. In some embodiments, multiple layers of acoustic foam 80 can be used with a decoupling mass loaded layer mounted between the layers of acoustic foam. Other types of suitable materials and acoustic foams 80 with other characteristics can also be used to achieve the desired sound blocking performance within the helmet.

Figure 11C:
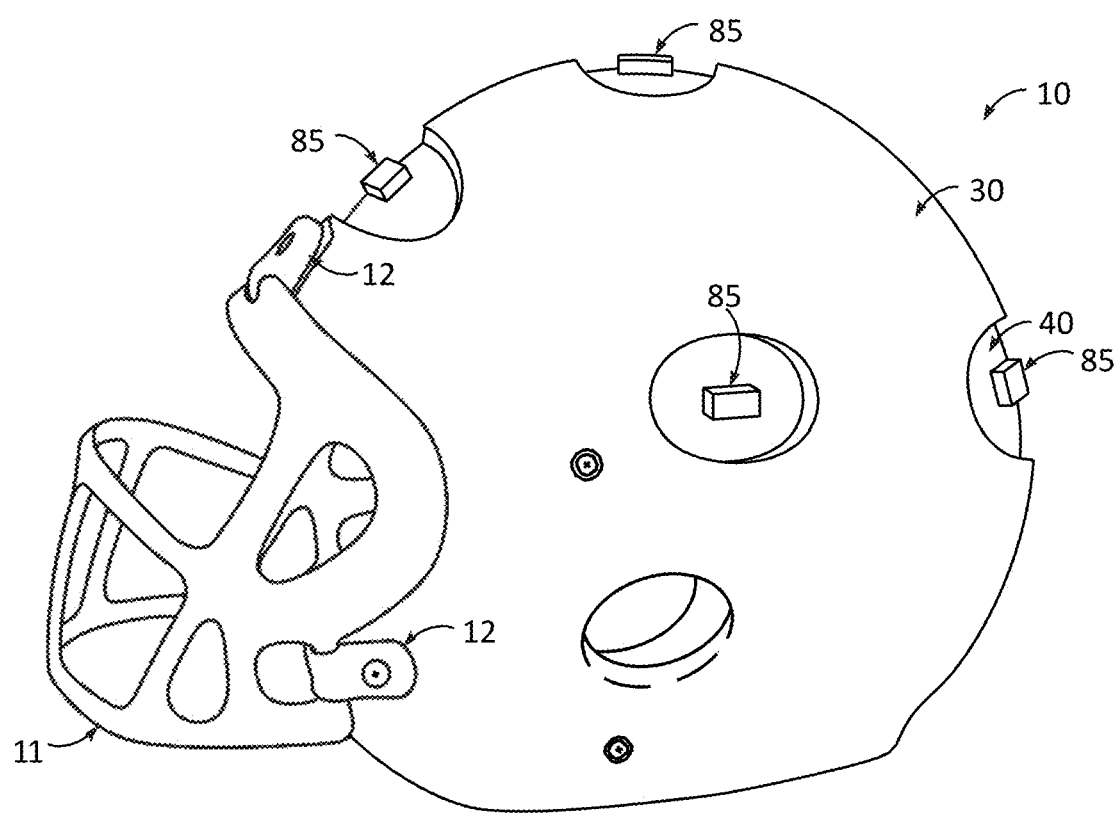
FIG. 11*c* depicts a side view of a protective headgear according to some embodiments disclosed herein.

As shown in FIG. 11*c*, the helmet 10 can further comprise one or more sensors 85 that are disposed inside or on the exterior surface of the helmet and configured to provide data for real-time monitoring or for later data collection. For example, the helmet 10 can include one or more accelerometers that are configured to record the forces experienced by the helmet or wearer during use. Additionally or alternatively, the helmet can include four or more sensors 85 that are configured to record acceleration. These sensors can be coupled to the core 40. Further, the sensors 85 can be spaced apart on the helmet and configured such that they provide data from various locations. For example, the sensors 85 can be placed on the front, rear, sides, and/or top of the helmet. The sensors 85 can be configured to detect any suitable information, for example the frequency of impacts, the magnitude of impacts, and/or the location of impacts on the helmet.

Figure 11D:
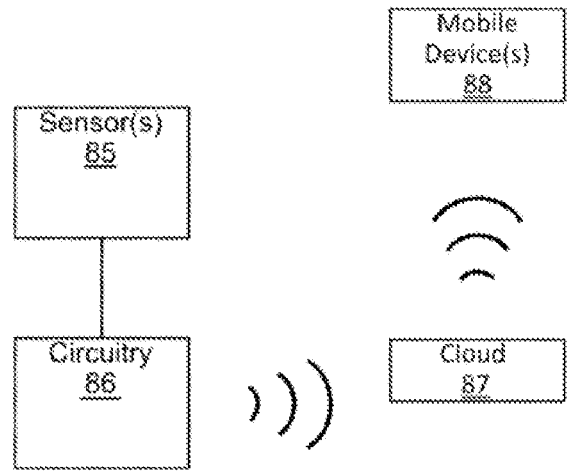
FIG. 11*d* is a high-level block diagram of an example circuitry that can be included in a helmet according to some embodiments disclosed herein.
Figure 11E:
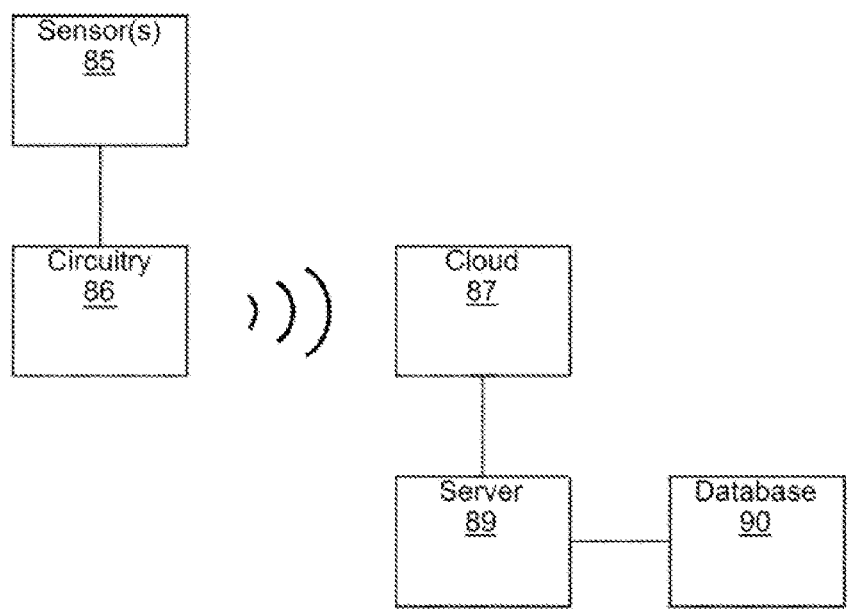
FIG. 11*e* is another high-level block diagram of an example circuitry that can be included in a helmet according to some embodiments disclosed herein.

Further, as shown schematically in FIGS. 11*d*-11*e*, the helmet can include a circuitry 86 for connecting to and/or communicating with electronics included in the helmet and/or electronics remote from the helmet. For example, the helmet 10 can include a circuitry 86 that is configured to be in communication with one or more sensors coupled to the helmet to control the sensors and collect the data collected by the sensors. The circuitry 86 can communicate the data generated by the sensors via a cloud 87 to one or more remote devices (e.g., mobile device 88). For example, the circuitry 86 can transmit the data generated by the sensors 85 via any suitable communication network, such as the cloud 87, to a server 89 for storage in a database 90 residing on the server. In some embodiments, the sensors can be configured to detect existence of gaps between the wearer's head and the helmet.

Figure 12:
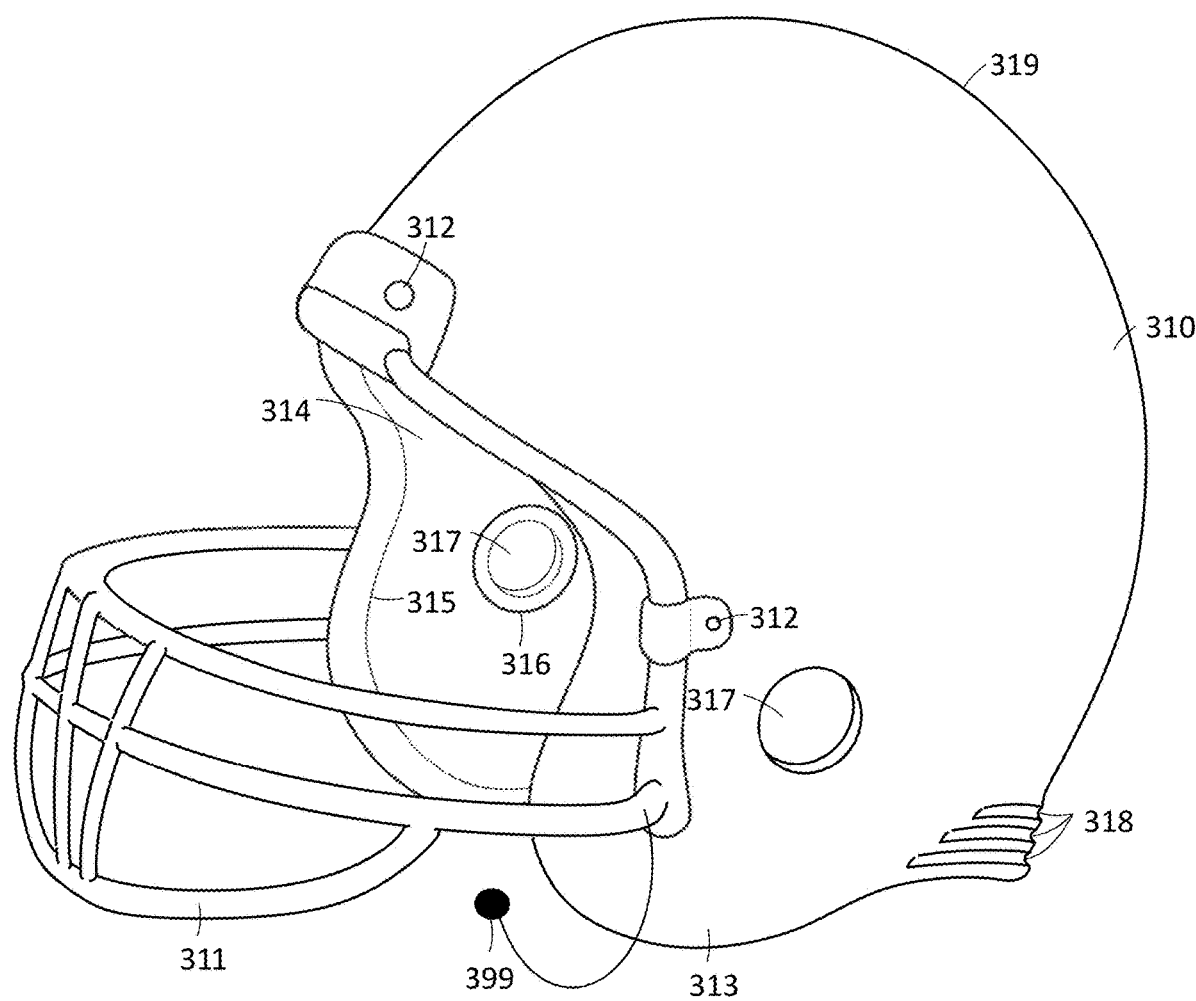
FIG. 12 depicts an illustrative example of a protective headgear according to some embodiments disclosed herein.

FIG. 12 depicts an illustrative example of a protective headgear according to some embodiments disclosed herein. As shown, a facemask 311 is attached to the helmet 310 using facemask mounted snaps 312. The facemask 311 can comprise any suitable material, such as carbon fiber configured to reduce the overall weight of the helmet.

As shown in FIG. 12, the helmet 310 can comprise an outer layer 313 and an inner layer 314. The outer layer 313 can cover the exterior of the helmet and be configured to meet the inner layer 314 at a seam 315 on the inside edge of the helmet and at a seam 316 on the inside edge of each ear hole 317. At the portion of the helmet 310 closest to a person's neck, the outer layer 313 can contain multiple grooves 318 that are roughly parallel to the bottom edge of the helmet 310. The grooves 318 can allow the helmet 310 to flex near the neck, providing support to the neck in a frontal impact without restricting a wearer's range of motion.

Further, the helmet 310 can comprise a cone shape or an approximate cone shape with a rounded apex 319 positioned to the rear of the top of the helmet relative to a user when viewed from the side. Specifically, the helmet can have an exterior profile that is configured to deviate from being spherical (e.g., cone shaped), when viewed from the side or front. This subtle cone shaped exterior of the helmet can decrease the occurrence of nearly elastic collisions when compared to the nearly spherical helmets in the prior art. The cone's rounded apex can be positioned to the rear of the top of the helmet, relative to a user when viewed from the side. The precise height and location of the rounded apex can be adjusted to suit a wearer's weight and helmet size.

Figure 13:
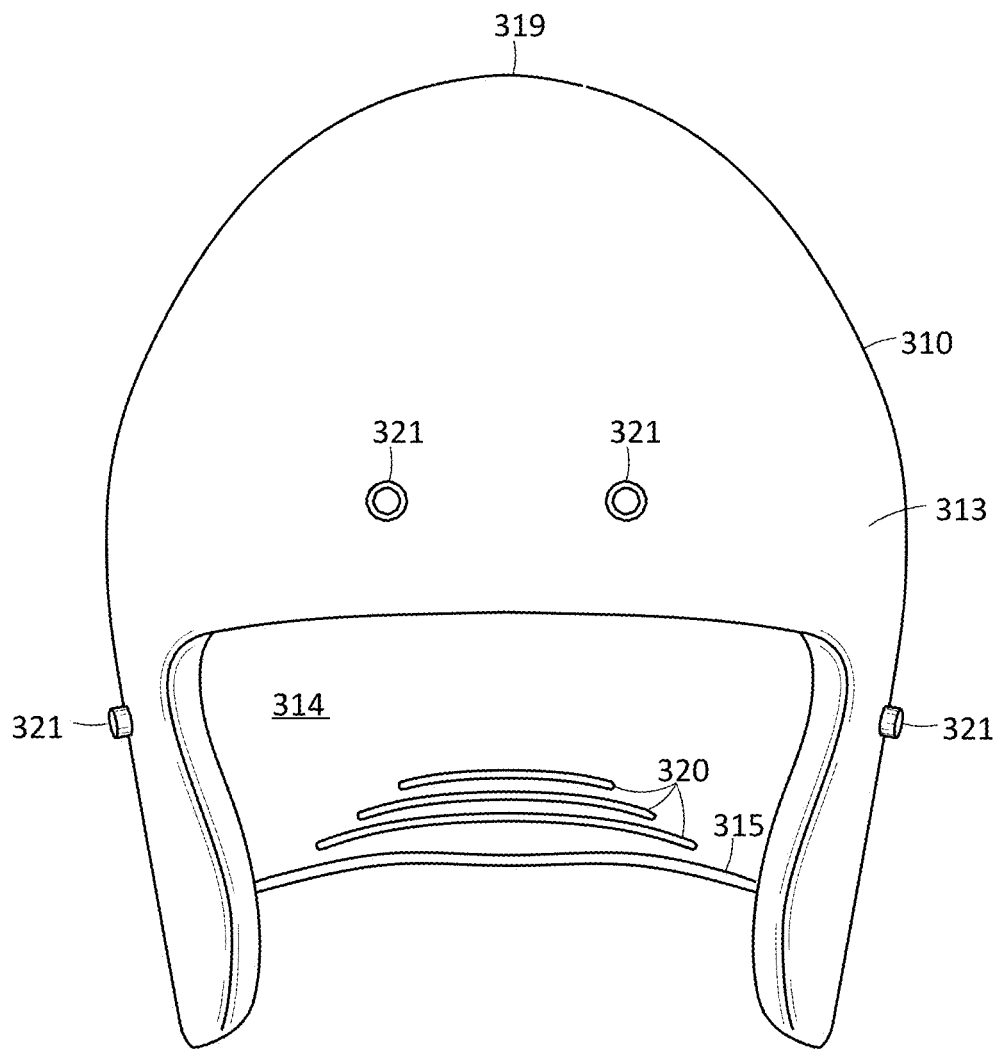
FIG. 13 depicts a front view of a protective headgear according to some embodiments disclosed herein.

FIG. 13 depicts a front view of the helmet 310. As shown, the helmet 310 can comprise a seam 315 positioned between the outer layer 313 and inner layer 314. The seam 315 can be configured to continue along the inside edge of the helmet 310. Further, the inner layer 314 can contain multiple grooves 320 that are similar to the grooves 318 in the outer layer 313. The inner grooves 320 can be roughly parallel to the ground when the helmet is upright and allow the helmet 310 to flex near the neck to provide support without restricting a wearer's range of motion.

On the front of the helmet, four helmet mounted snaps 321 can extend through the outer layer 313 to provide a location for the facemask mounted snaps 312 to attach. The apex 319 is located substantially on the centerline of the helmet, when viewed from the front such that the right half and the left half of the helmet are substantially mirror images of each other.

Figure 14:
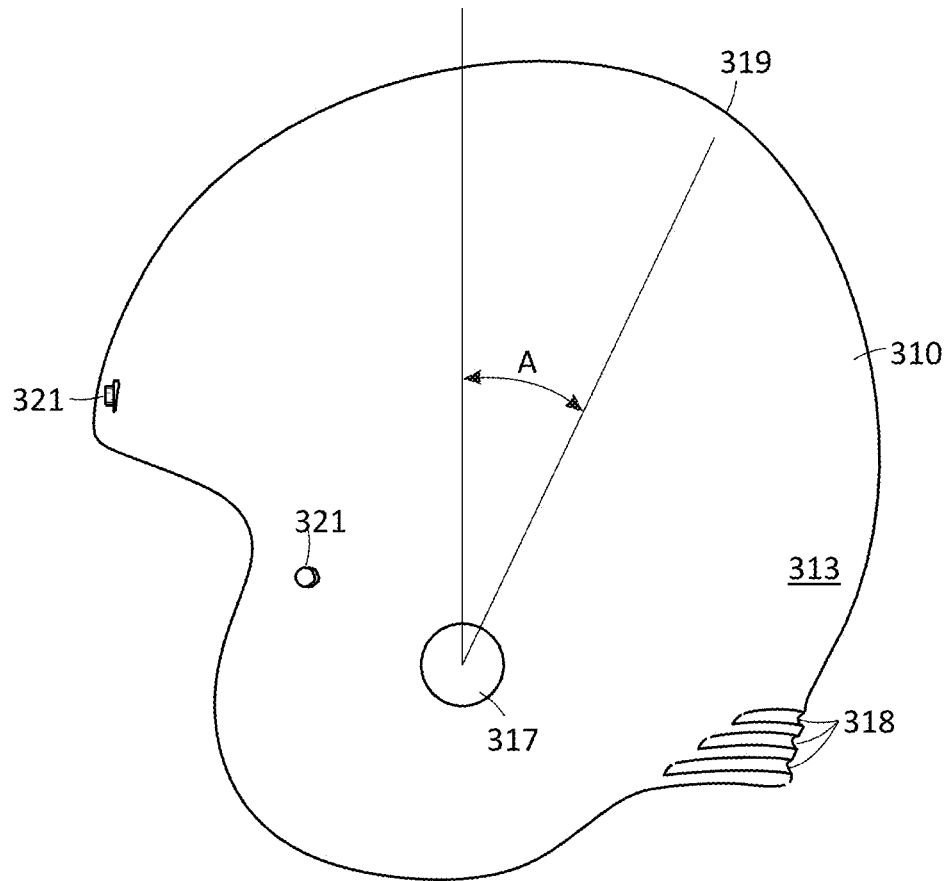
FIG. 14 depicts a side view of the protective headgear of FIG. 13.

FIG. 14 is a left side view of the helmet 310 without a facemask attached. Only the outer layer 313 is visible in this view because the seams 315 and 316 are on the inside edges of the helmet 310 and on the inside edge of the ear holes 317. Two of the helmet mounted snaps 321 are also visible in this view, extending through the outer layer 313. The side profile of the grooves 318 are visible in this view and show the curved profile of the grooves in the second embodiment. Various types of reliefs or a reduction in the thickness of the outer layer 313 can be used to increase the flexibility of the material in the neck area. In addition, the use of a different material at the neck area can provide more or less rigidity as required.

FIG. 14 also depicts the location of apex 319. As shown, the cone's rounded apex can be positioned to the rear of the top of the helmet relative to a user when viewed from the side. Using a vertical line originating from the center of the ear hole 317, and a line originating from the center of the ear hole 317 and intersecting the helmet at the apex 319, Angle "A" defines the angle between the two lines at the center of the ear hole. The apex 319 can provide the most impact deflection, when located at a point rearward of the vertical line so that the apex 319 is most effective when Angle "A" is greater than zero. For example, Angle "A" can be approximately 25 degrees. The ideal location of the apex 319 can depend on the weight of the wearer and the height of the apex above the outer surface of the helmet. For example, in some embodiments, the location of the apex 319 can be effective when Angle "A" is between and including zero and 35 degrees (e.g., in a range of about 10° to about 25°).

Figure 15:
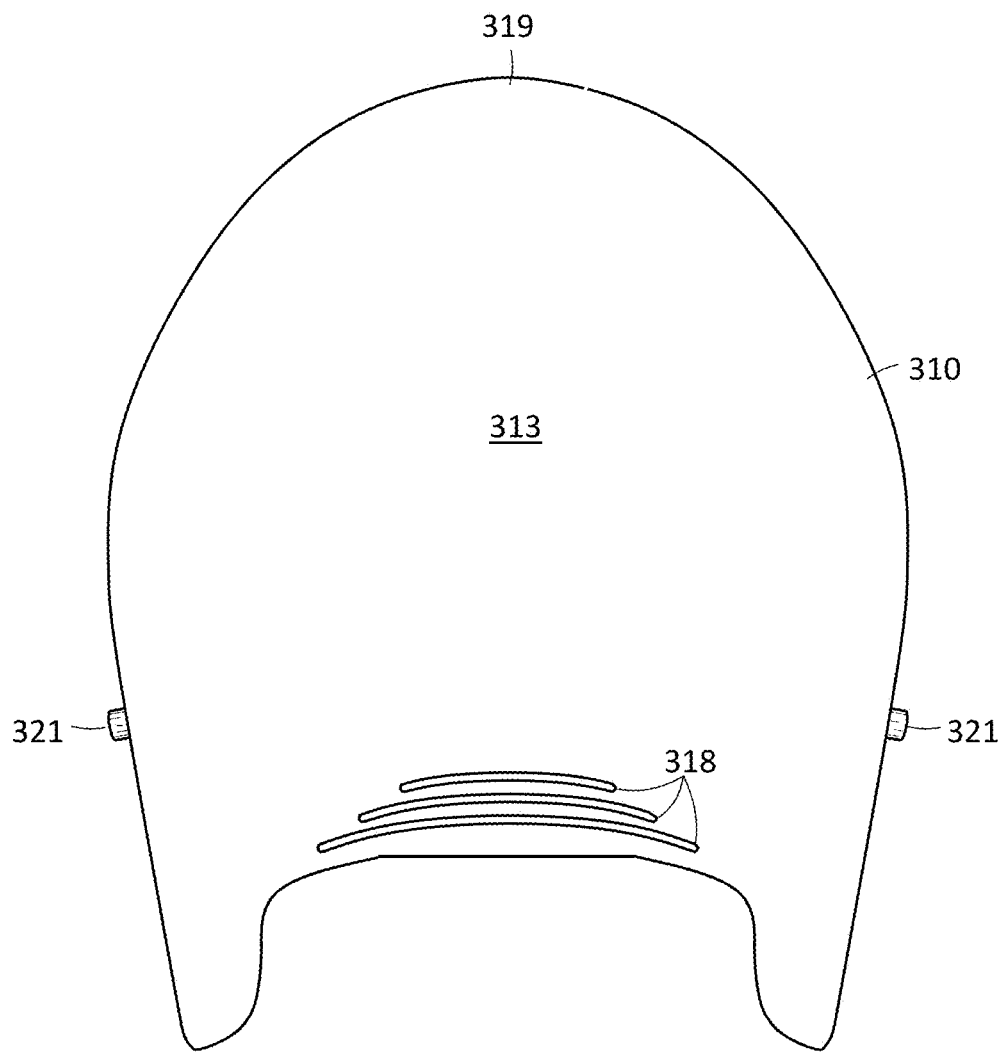
FIG. 15 depicts a rear view of the protective headgear of FIG. 13.

FIG. 15 depicts a rear view of the helmet 310 without a facemask attached. Similar to FIG. 14, only the outer layer 313 is visible in this view because the seams 315 and 316 are on the inside edges of the helmet 310 and on the inside edge of the ear holes 317. Two of the helmet mounted snaps 321 are visible in this view where they extend through the outer layer 313. The rear view of the outer grooves 318 can also be seen in this view. The outer grooves 318 can generally follow the bottom edge of the rear of the helmet 310 and can be generally parallel to the ground when the helmet is upright. The apex 319 of the helmet 310 can be located on the centerline of the helmet.

Figure 16:
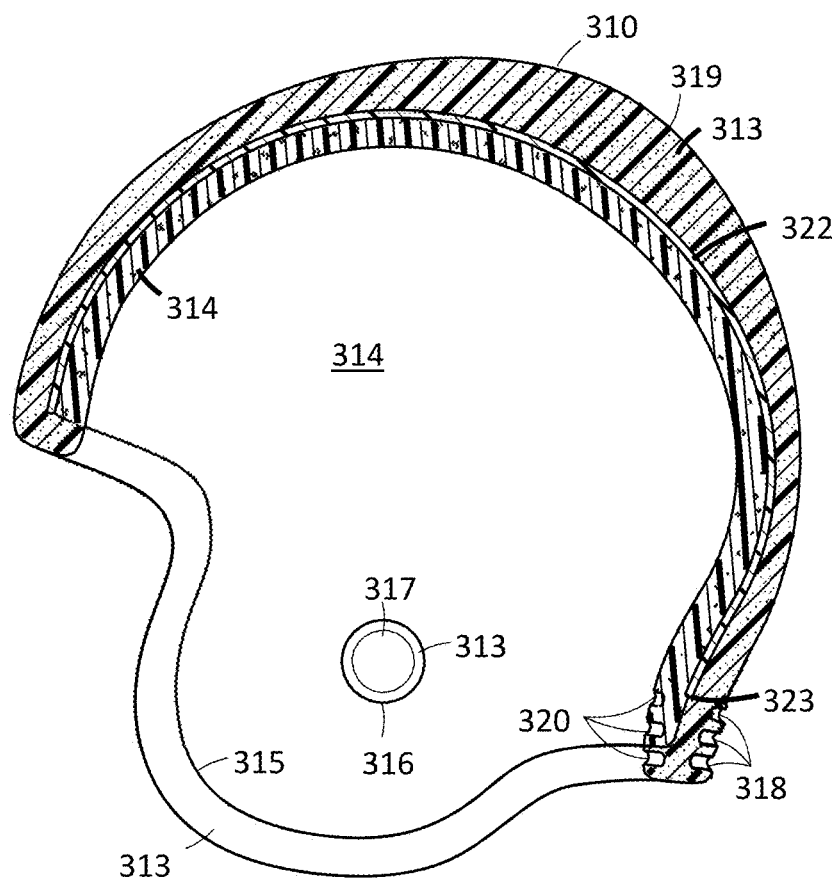
FIG. 16 depicts another side view of the protective headgear of FIG. 13.

FIG. 16 depicts a left side sectioned view of the helmet 310. As shown, the inner layer 314 comprises an impact absorbent material that can substantially conform to a wearer's head and can be designed to eliminate any gaps between a wearer's head and the helmet, in order to cushion impacts. The outer layer 313 is also an impact absorbent material, which is designed to resist abrasions and allow the application of a surface color or design. The core 322 is placed between the outer layer 313 and inner layer 314 and configured to provide structural support to the helmet and protection against larger impacts to the head.

Further, as shown in FIG. 16, the seam 315 can be positioned where the outer layer 313 and inner layer 314 meet. The core 322 can be configured to end before the edge of the helmet 310 and the outer layer 313 can be configured to roll about the edge to meet the inner layer 314 on the inner edge of the helmet 310. At the base of the helmet above the neck, the core 322 can be configured to end at a point 323 above the outer grooves 318 and inner grooves 320. Because the core 322 is less flexible than the outer layer 313 and the inner layer 314, in some embodiments, only the outer layer 313 and inner layer 314 are present below point 323, in order to allow the helmet to flex with a wearer's movements. Further, the outer grooves 318 and/or the inner grooves 320 can be configured such that they are roughly parallel to the bottom edge of the rear portion of the core 322. While a sectioned view of the seam 316 around the ear holes 317 is not provided, it is substantially similar to the sectioned view of the seam 315 about the edge of the helmet 310.

Further, as detailed above, the inner layer 314 can comprise a viscoelastic polyurethane foam ("viscoelastic foam"), such as low-resilience polyurethane foam, memory foam, temper foam, or similar foams. The viscoelastic foam can be configured to be pressure and temperature sensitive and to quickly mold to the contour of an object pressed against it. Specifically, the viscoelastic foam can be configured to mold around the contour of an object and allow a helmet to contour to the head of multiple wearer, while eliminating gaps between the inner layer 314 and a wearer's head without resorting to an expensive helmet customization process.

As noted previously, the viscoelastic foam can also provide effective impact cushioning and temperature control. Specifically, the viscoelastic foam can be configured to absorb impacts between a wearer's head and the rigid 322. The viscoelastic foam can also stabilize the temperature of objects placed against the foam and absorb and release heat slowly, thereby stabilizing the temperature of a wearer's head.

As also noted previously, the inner layer 314 can comprise a viscoelastic foam with gel-like properties (e.g., an open cell structure and a soft dough-like consistency). The inner layer 314 can also include an additional layer of lightweight viscoelastic foam configured to absorb the impact energy from sudden impacts. For example, an elastomeric, polyurethane viscoelastic open cell foam with a density between and including about 2 and 15 pounds per cubic foot can be used. The additional layer of lightweight viscoelastic foam can be configured as a layer sandwiched within the gel-like viscoelastic foam or used between the gel-like viscoelastic foam and the core 322. Other materials with similar impact absorbing and density properties can also be suitable.

Further, the apex 319 on the exterior of the helmet can be formed by increasing the thickness of the outer layer 313 in the area of the apex. Increasing the thickness of the outer layer 313 can allow the core 322 and inner layer 314 to remain molded to the shape of a user's head. Building up the outer layer 313 can also provide additional impact absorption material in the area of the apex and provide a helmet shape that is less likely to produce an elastic collision when compared to a helmet with a nearly spherical exterior.

Figure 17:
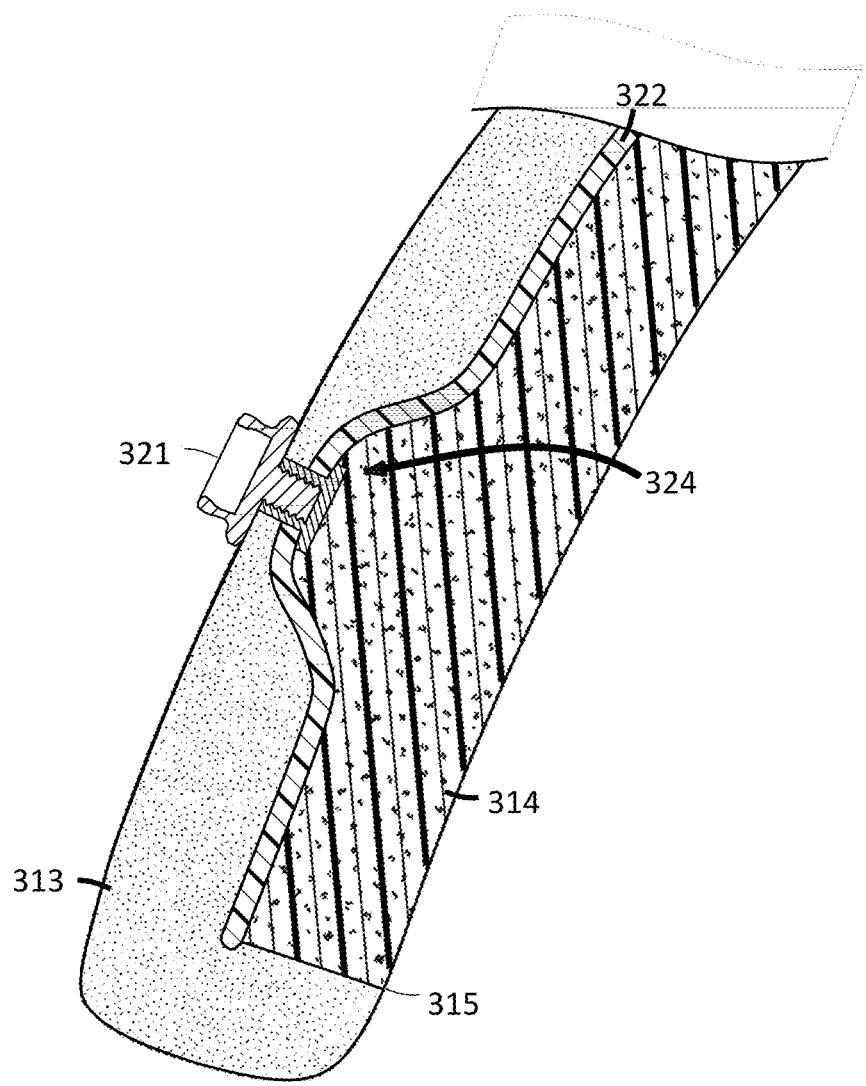
FIG. 17 depicts another side view of a protective headgear according to some embodiments disclosed herein.

FIG. 17 depicts a side sectioned view of a helmet mounted snap 321 showing the mounting detail and the edge detail of the helmet. The helmet mounted snaps 321 can be mounted to the core 322. To position the helmet mounted snaps at an effective height beyond the outer layer 313, the rigid core can be configured to contain one or more circular extrusions 324 that extend towards the outside of the helmet. The circular extrusions 324 can have the added benefit of moving the mounting hardware for the helmet mounted snaps 321 further from a wearer's head. The outer layer 313 can be mounted to the outer surface of the core 313 and configured to extend around the edge of the helmet. The inner layer 314 can be mounted to the inner surface of the core 313 and be configured to meet the outer layer 314 at a seam 315 running along the inside edge of the helmet.

Figure 19:
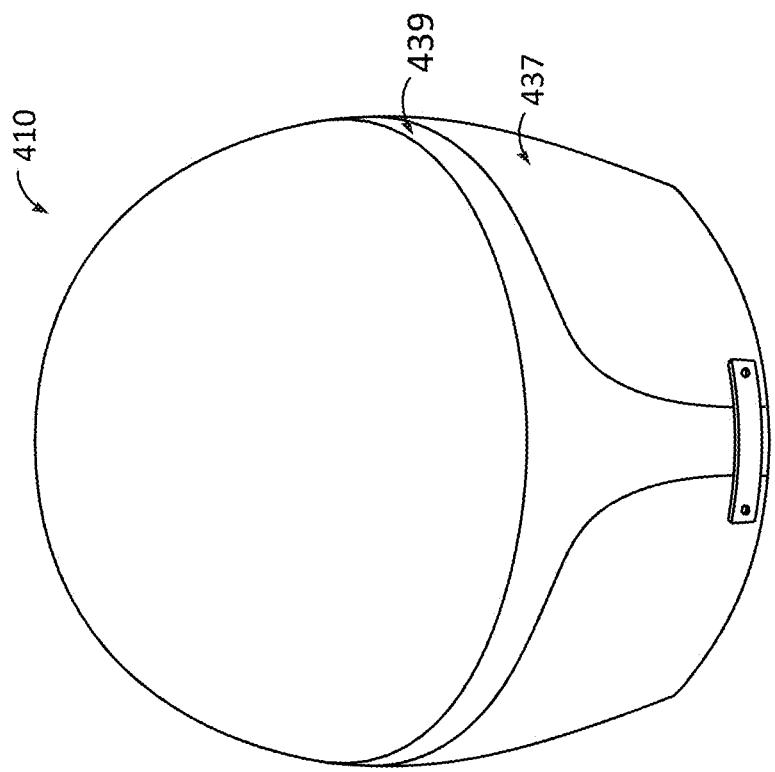
FIG. 19 depicts a rear view of the protective headgear of FIG. 18.
Figure 18:
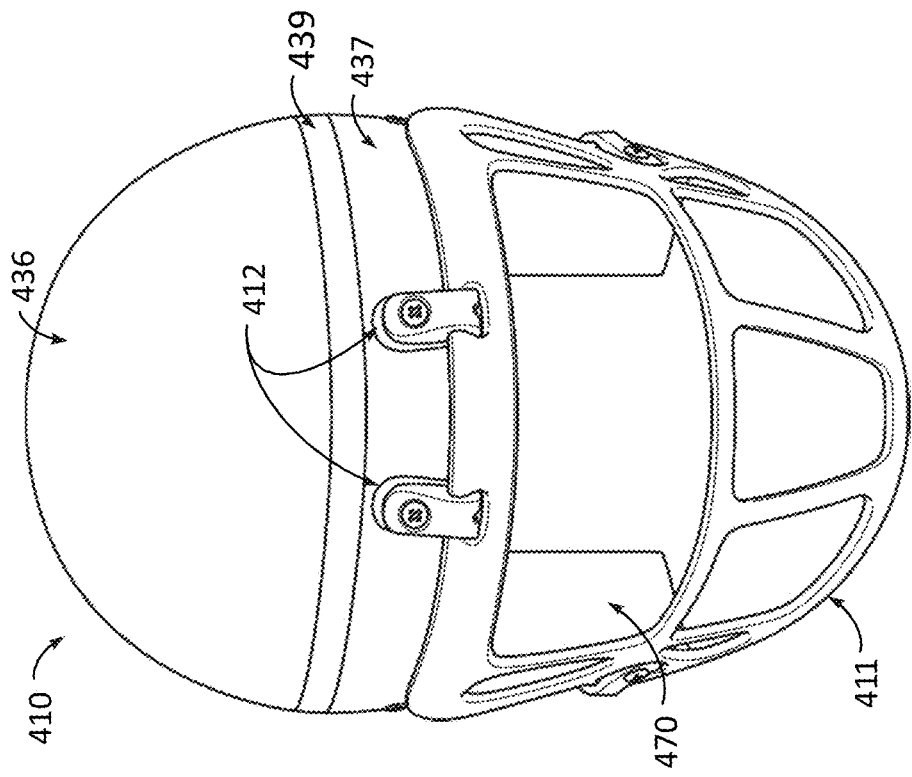
FIG. 18 depicts an illustrative example of a protective headgear according to some embodiments disclosed herein.

FIGS. 18-19 depict the front and rear views of a helmet 410 having a facemask 411 according to some embodiments disclosed herein. As shown and noted previously, the facemask 411 can be attached to the helmet 410 using one or more fasteners 412. The fasteners 412 can be any fastener 412 known in the art. Further, the fasteners 412 can be configured such that they break away at a certain level of shear force or tension. Further, the facemask 411 can comprise carbon fibers that are configured to reduce the overall weight of the helmet. Additionally or alternatively, the facemask 411 can comprise a durable material, such as a metallic material, a polymer, or a composite material. Further, the helmet 410 can include a liner 470, as detailed above.

Figure 21:
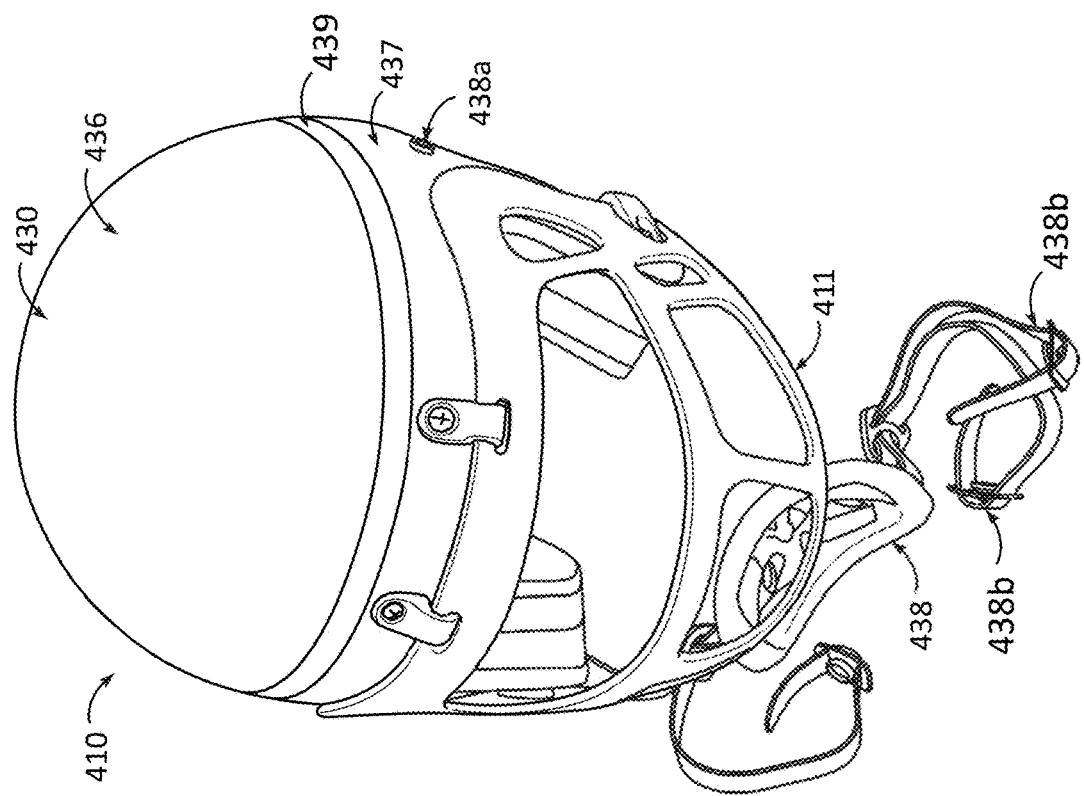
FIG. 21 depicts another prospective view of the protective headgear of FIG. 20.
Figure 20:
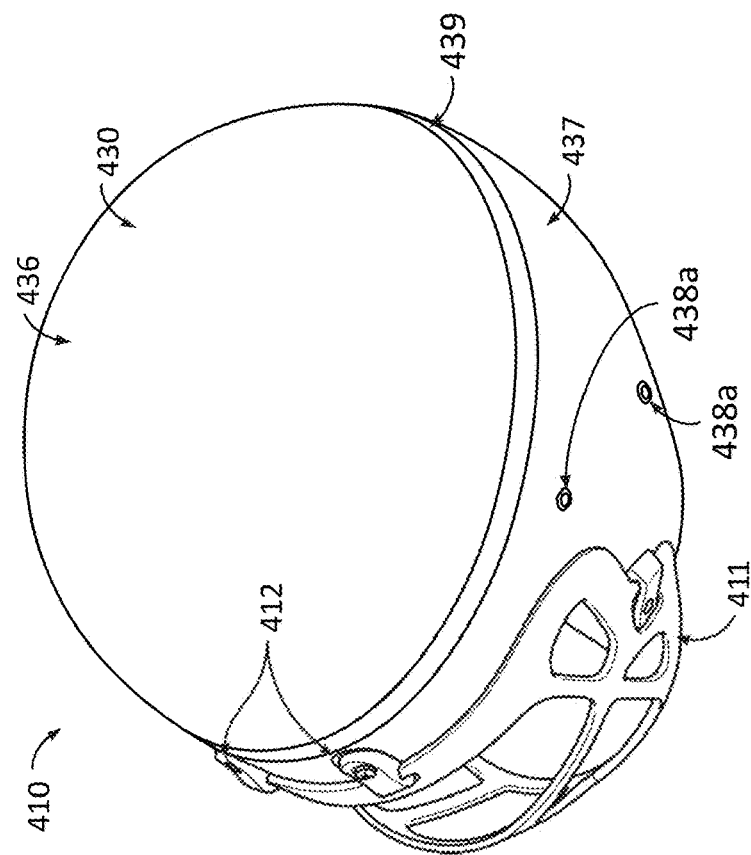
FIG. 20 depicts prospective view of an illustrative example of a protective headgear according to some embodiments disclosed herein.

FIGS. 20-21 are perspective views of the helmet 410 with a facemask 411 and a chin-strap 438 partially attached. The chin strap 438 can be configured to attach to the helmet 410 using one or more studs 438a. The studs 438a can be mounted to the core of the helmet using any suitable technique known in the art. The chinstrap 438 can further comprise one or more snaps 438b that are configured to attach to the studs 438a. The attachment strength between the snaps 438b and the studs 438a can be configured to reduce the occurrence of neck injuries in a wearer. For example, the chinstrap 438 can be configured such that if another wearer grabs the chinstrap 438, the snap 438b separates from the stud 438a in response to exertion of a certain predetermined amount of force. For example, the snap 438b can be configured to separate from the stud 438a, when the wearer's head or the helmet 410 is subject to a force exceeding about four gravitational forces. By way of example, the snaps 438b can further be configured to release when the helmet is twisted at a force exceeding about four gravitational forces relative to a person's head. A person's neck can generally only withstand about four gravitational forces. Therefore, the snap 438b can be configured such that it causes the helmet to release at such level of force rather than risk injuring the wearer's neck.

Although this specification discloses advantages in the context of certain illustrative, non-limiting embodiments, various changes, substitutions, permutations, and alterations may be made without departing from the scope of the specification as defined by the appended claims. Further, any feature described in connection with any one embodiment may also be applicable to any other embodiment.

What is claimed is:

1. A protective headgear comprising:
    a rigid core; and
    a plurality of impact absorbing layers disposed on the rigid core and configured to absorb impact incident on the protective headgear; said plurality of impact absorbing layers comprising an inner layer and an outer layer disposed directly on opposed sides of said rigid core;
    wherein at least one of said impact absorbing layers comprises a plurality of impact absorbing components;
    wherein the impact absorbing components comprise conical elements each having an internal cylindrical void;
    wherein at least one of said impact absorbing components further comprises a barrier fixed to a distal end thereof such that said at least one of said impact absorbing components is fixed to the rigid core at a proximal end thereof and fixed to said barrier at said distal end; and
    wherein the barrier is configured to prevent the passage of air.

2. The protective headgear of claim 1, wherein the internal cylindrical void in each impact absorbing component has an axis that is oriented along an axis of the impact absorbing component.

3. The protective headgear of claim 2, wherein the rigid core comprises at least one of a layer of carbon fiber reinforced polymer and a layer of reinforced polymer, the layer of polymer having a hardness in a range approximately 28 Shore D to approximately 68 Shore D.

4. The protective headgear of claim 3, wherein the layer of carbon fiber reinforced polymer comprises a plurality of carbon filaments combined with a resin and a rubberizing compound.

5. The protective headgear of claim 1, wherein the inner layer of the plurality of impact absorbing layers comprises an inner layer configured to contact a head of a wearer of the protective headgear, the inner layer being configured to conform to the head of the wearer and reduce any gaps between the inner layer and the head of the wearer.

6. The protective headgear of claim 1, wherein the plurality of impact absorbing layers comprises a liner removably and replaceably coupled to an interior of the protective headgear.

7. The protective headgear of claim 6, wherein the liner comprises at least one of a material providing a wicking effect, a material providing an anti-bacterial effect, a material providing an anti-microbial effect, and a material configured to function as a moisture barrier.

8. The protective headgear of claim 1, wherein the plurality of impact absorbing components comprises at least one of fluid-filled bladders, gas-filled bladders, liquid filled bladders, semifluid-filled bladders, semisolid bladders, vinyl encased impact absorbing members, and mechanical shock absorbing components.

9. The protective headgear of claim 1, wherein the plurality of impact absorbing components comprise one or more layers of foam.

10. The protective headgear of claim 1, wherein the plurality of impact absorbing components further comprise one or more cylindrical elements each having an internal cylindrical void.

11. The protective headgear of claim 1, further comprising at least one of: a forehead pad configured to be disposed at a portion of the protective headgear where a forehead of a wearer of the protective headgear is expected to abut the protective headgear, one or more elongate strips configured to be disposed at a portion of the protective headgear where a side of the wearer's head is expected to abut the protective headgear, and one or more ear strips configured to be disposed at a portion of the protective headgear where an ear of the wearer is expected to abut the protective headgear.

12. The protective headgear of claim 1, further comprising at least one abrasion resistance layer.

13. The protective headgear of claim 1, further comprising an acoustic element configured to reduce one or more predetermined sound frequencies.

14. The protective headgear of claim 1, further comprising one or more sensors coupled to at least one area on the protective headgear.

15. The protective headgear of claim 1, further comprising a removable face mask.

16. The protective headgear of claim 1, wherein the rigid core comprises a layer of carbon fiber and a layer of poly-para-phenylene terephthalamide.

\* \* \* \* \*